US010058464B2

(12) United States Patent
Naber et al.

(10) Patent No.: US 10,058,464 B2
(45) Date of Patent: Aug. 28, 2018

(54) COT FASTENING SYSTEM

(71) Applicant: Stryker Corporation, Kalamazoo, MI (US)

(72) Inventors: Brandon David Naber, Portage, MI (US); Kurosh Nahavandi, Portage, MI (US); Nathan Wray Matheny, Portage, MI (US); Michael T. Brubaker, Vicksburg, MI (US); Charles Louis Crouch, Plainwell, MI (US); Clifford Edwin Lambarth, Portage, MI (US); Jason James Wroblewski, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 15/290,004

(22) Filed: Oct. 11, 2016

(65) Prior Publication Data

US 2017/0112694 A1 Apr. 27, 2017

Related U.S. Application Data

(60) Provisional application No. 62/245,563, filed on Oct. 23, 2015.

(51) Int. Cl.
*B60P 7/08* (2006.01)
*A61G 3/08* (2006.01)
(Continued)

(52) U.S. Cl.
CPC ......... *A61G 3/0825* (2013.01); *A61G 1/0262* (2013.01); *A61G 3/0254* (2013.01);
(Continued)

(58) Field of Classification Search
CPC .. B61G 3/0825; A61G 3/0262; A61G 3/0875; A61G 3/0883; A61G 3/0891
(Continued)

(56) References Cited

U.S. PATENT DOCUMENTS 5,092,722 A 3/1992 Reazer, III et al.
5,205,601 A 4/1993 Ferris
(Continued)

FOREIGN PATENT DOCUMENTS

AU 2008275416 B2 1/2009
DE 3536813 A1 4/1987
(Continued)

*Primary Examiner* — Stephen T Gordon
(74) *Attorney, Agent, or Firm* — Warner Norcross + Judd LLP

(57) ABSTRACT

A cot fastening system for fastening a cot to an emergency vehicle includes a frame configured for mounting to the floor of an emergency vehicle, which has a longitudinal axis and a cot loading direction along the longitudinal axis. A first restraint assembly is for coupling to a foot end cot attachment of a cot and is mounted to the frame. A second restraint assembly is for coupling to a head end cot attachment of the cot and is mounted to the frame. The frame includes a first section and a second section. The first section has a first width less than the spacing between head end wheels of the cot to allow the cot to straddle the frame. The second section extends from the first end of the first section along the longitudinal axis of the frame and diverges away from the longitudinal axis of the frame to a second width greater than the first width but less than the spacing between the head end wheels to form a guide for guiding the head end wheels of the cot when the head end cot attachment has passed the first restraint assembly and is at or near the second restraint assembly to thereby guide the head end cot attachment into alignment with the second restraint assembly.

22 Claims, 18 Drawing Sheets

(51) Int. Cl.
*A61G 1/02* (2006.01)
*A61G 3/02* (2006.01)

(52) U.S. Cl.
CPC ......... *A61G 3/0833* (2013.01); *A61G 3/0875* (2013.01); *A61G 3/0883* (2013.01); *A61G 3/0891* (2013.01)

(58) Field of Classification Search
USPC ......... 410/66, 67, 69, 77, 80, 7; 296/19, 20; 248/503; 5/511
See application file for complete search history.

(56) References Cited

U.S. PATENT DOCUMENTS

| | | |
|---|---|---|
| 6,796,757 B1 | 9/2004 | Way et al. |
| 7,478,855 B2 | 1/2009 | Lambarth et al. |
| 7,686,549 B1 * | 3/2010 | Posey .................. B60P 3/073 410/19 |
| 2003/0071472 A1 | 4/2003 | Henderson et al. |
| 2007/0154275 A1 * | 7/2007 | Jeppsson ............ A61G 3/0808 410/7 |

FOREIGN PATENT DOCUMENTS

| | | |
|---|---|---|
| GB | 19098428 | 4/1909 |
| GB | 1051480 | 12/1966 |
| GB | 2203999 A | 11/1988 |
| GB | 2297730 A | 8/1996 |
| JP | 2002153512 A | 5/2002 |
| WO | 199804228 | 2/1998 |
| WO | 2004064698 A2 | 8/2004 |
| WO | 2006004820 A1 | 1/2006 |
| WO | 2009009296 A2 | 1/2009 |
| WO | 2014123692 A1 | 8/2014 |
| WO | 2014124471 A1 | 8/2014 |

* cited by examiner

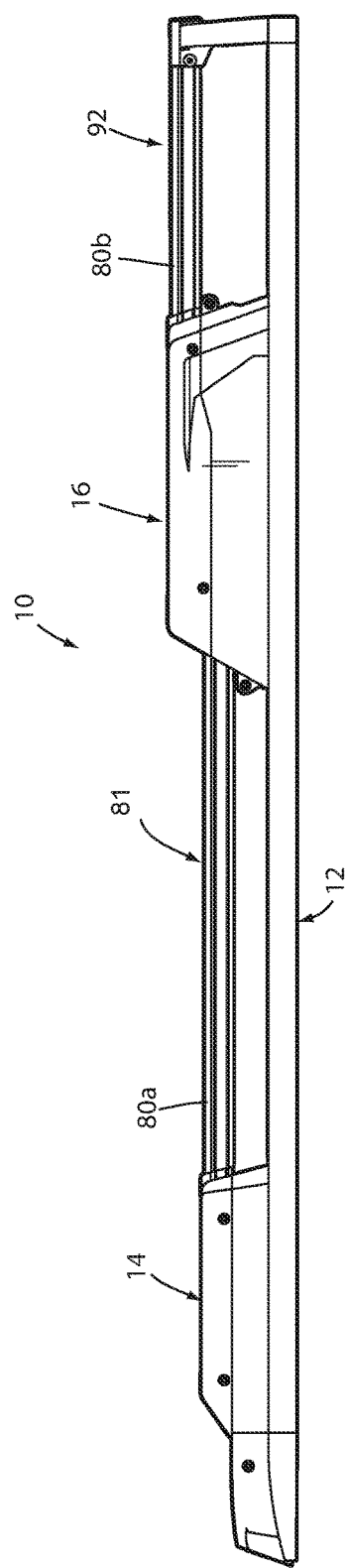
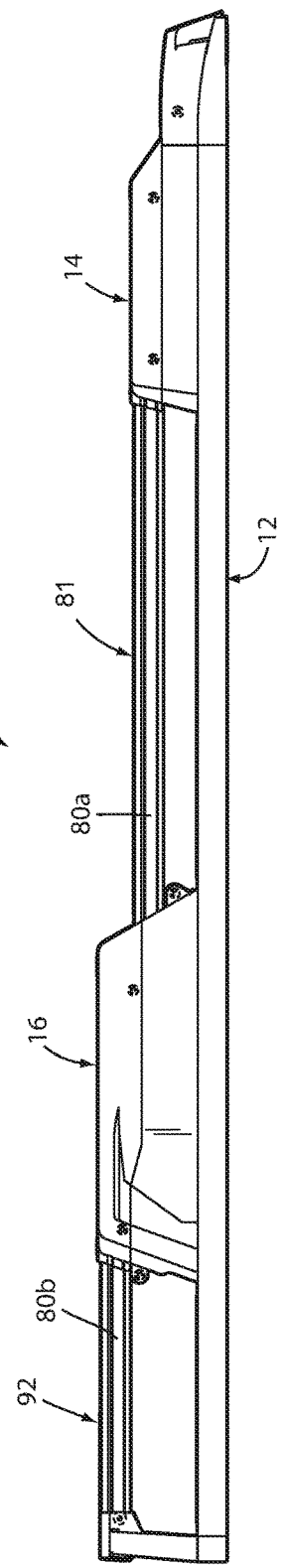

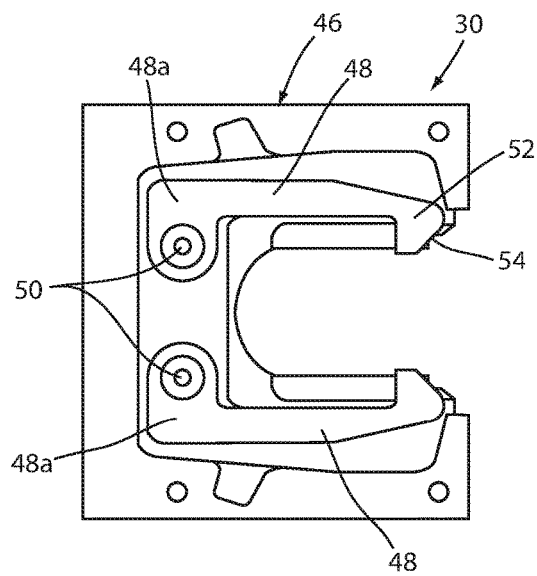
FIG. 13
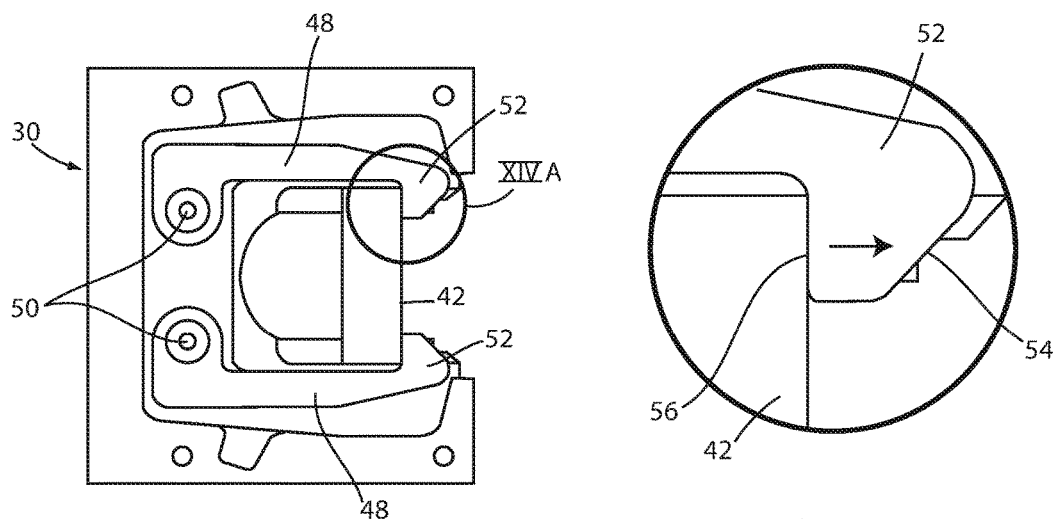
FIG. 14
FIG. 14A
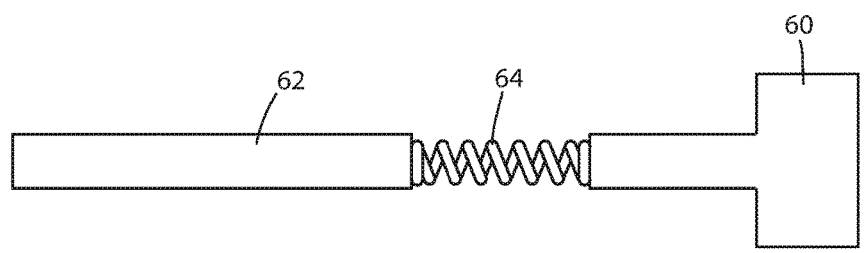
FIG. 14B

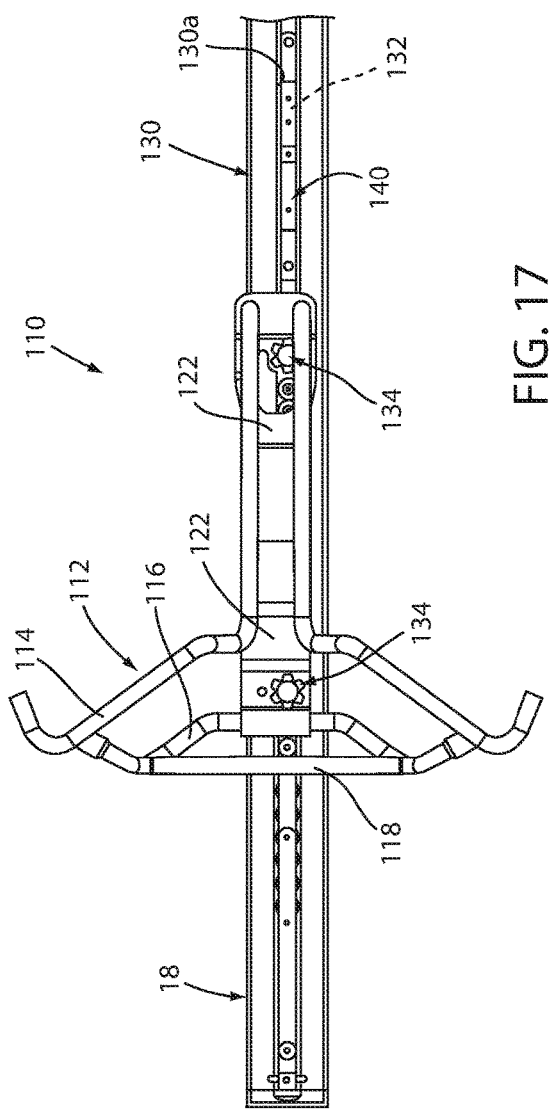
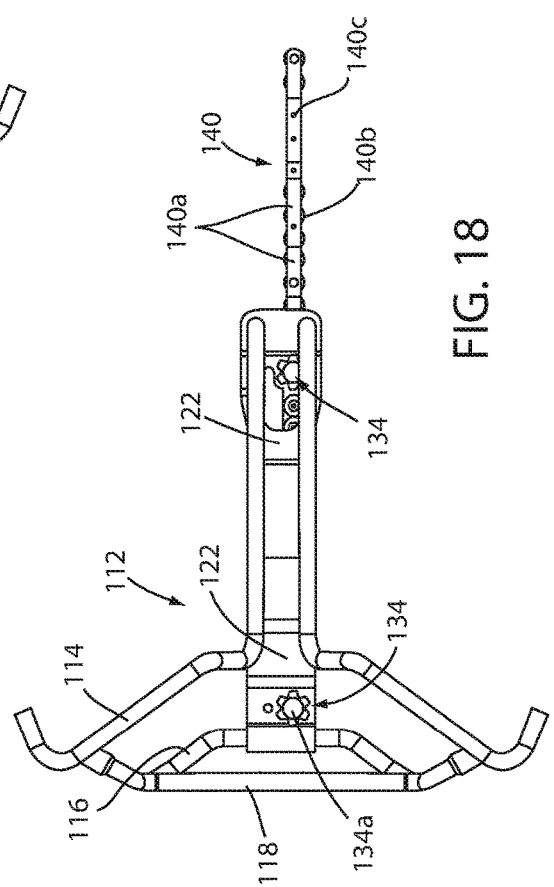

COT FASTENING SYSTEM

This application claims the benefit of U.S. Provisional Patent Application No. 62/245,563, filed on Oct. 23, 2015, by inventor Brandon David Naber et al., entitled COT FASTENING SYSTEM, the disclosure of which is incorporated herein by reference in its entirety.

TECHNICAL FIELD AND BACKGROUND OF THE INVENTION

The present disclosure relates to a fastening system for securing a patient support in an emergency vehicle and, more particularly, for securing a cot to the floor of an emergency vehicle.

Current fastening systems for securing a cot in an emergency vehicle include floor mounts, often referred to as "antler" anchors, tilt trays, and movable loading arms. Floor mounts are tubular structures configured for engagement by a head end cot attachment of a cot and are anchored to the floor of the emergency vehicle. Floor mounts are typically mounted inward of the opening of the emergency vehicle, near the rear of the emergency vehicle compartment.

Tilt trays include a base or track upon which a tiltable tray is movably mounted for movement between a first position within the emergency vehicle compartment and an extended loading or unloading position, with a portion of the tray extended outwardly from the rear opening of the emergency vehicle.

Cot fastening systems with movable loading arms typically include a track upon which loading arms are movably mounted, also for movement between a first position within the emergency vehicle compartment and an extended loading or unloading position, with at least a portion of the loading arms extended outwardly from the rear opening of the emergency vehicle.

SUMMARY OF THE INVENTION

According to one embodiment, the present disclosure provides a cot fastening system for fastening a cot in an emergency vehicle. The system includes a frame configured for mounting to a floor of an emergency vehicle, a first restraint assembly, and a second restraint assembly. The first restraint assembly is for coupling to a foot end cot attachment of a cot and is mounted to the frame. The second restraint assembly is for coupling to a head end cot attachment of a cot and is also mounted to the frame. The frame includes a first section and a second section, with the first section having a first width less than the spacing between the load wheels to allow the cot to straddle the frame. The second section extends from the first section and diverges away from the longitudinal axis of the frame to a second width. The second width is greater than the first width but less than the spacing between the load wheels so that the second section of the frame forms a guide for guiding the load wheels of the cot when the head end cot attachment has passed the first restraint assembly and is at or near the second restraint assembly to thereby guide the head end cot attachment into alignment with the second restraint assembly.

In one embodiment, the cot fastening system further includes a first mount and a second mount. The first mount mounts the first restraint assembly to the frame. The second mount mounts the second restraint assembly to the frame, with the frame extending between the first and second mounts.

In another embodiment, the second restraint assembly includes a catch and a second mount guide surface for guiding the head end cot attachment into alignment with the catch of the second restraint assembly.

In yet another embodiment, the first section and the second section each include a first end and a second end. The first restraint assembly is located at or near the first end of the first section. The second end of the first section abuts the first end of the second section, and the second mount guide surface is located between the first end and the second end of the first section adjacent to the second end of the first section.

According to yet another embodiment, the second section of the frame includes a pair of diverging sides, a pair of parallel sides defining the second width, and transition sections between each of the diverging sides and the parallel sides. The transition sections are spaced a distance from the second mount guide surface less than the distance between the load wheels and the head end cot attachment wherein the load wheels are first guided by the diverging sides of the second section of the frame to align with the second restraint assembly followed by the head end attachment being guided by the second mount guide surface to align with the catch of the second restraint assembly.

In another embodiment, the first mount is located at the first end of the first section. In a further embodiment, the first restraint assembly includes a latch, with the second mount guide surface for guiding the foot end cot attachment into alignment with the first restraint assembly. The first mount includes a first mount guide surface for guiding the foot end cot attachment into alignment with the latch of the first restraint assembly.

In yet another embodiment, the cot fastening system further includes a guide member extending between the first and second mounts for guiding a safety bar of the cot and for maintaining the safety bar in a non-deployed position while the cot is moved along the frame.

For example, the guide member may be formed by a channel member extending between the first and second mounts.

In yet another embodiment, the second mount is at least partially located in the first section of the frame.

In another embodiment, the frame is formed by a pair of elongated members. A first portion of the elongated members is parallel and forms the first section of the frame, and a second portion of the elongated members forms an obtuse angle there between to form the second section of the frame.

For example, the elongated members may include channel members.

In one embodiment, the first restraint assembly includes a pair of spring biased arms for engaging the foot end cot attachment.

In another embodiment, each of the arms is pivotally mounted about a vertical axis, which is generally orthogonal to the cot loading direction of the cot fastening system.

According to yet another embodiment, the cot fastening system includes a spring for biasing the cot in a direction opposed to the cot loading direction.

In yet another embodiment, the second restraint assembly includes the spring.

According to another embodiment, a cot fastening system for fastening a cot includes a frame configured for mounting to a floor of an emergency vehicle, a first restraint assembly, and a second restraint assembly. The first restraint assembly is for coupling to a first cot attachment of a cot and is mounted to the frame. The second restraint assembly is for coupling to a second cot attachment of the cot and is also mounted to the frame. The system further includes a spring for biasing the cot in a direction opposed from the cot loading direction to thereby apply a preload on at least one of the restraint assemblies.

In one embodiment, the first restraint assembly includes a foot end latch, with the spring biasing the first cot attachment to apply a pre-load on the first restraint assembly.

In another embodiment, the second restraint assembly includes the spring.

In a further embodiment, the first restraint assembly includes a pair of spring biased arms for engaging the first cot attachment. For example, each of the arms may be pivotally mounted about a vertical axis.

According to yet another embodiment, a cot fastening system for fastening a cot includes a frame configured for mounting to a floor of an emergency vehicle and a restraint assembly for coupling to a cot attachment. The restraint assembly is mounted to the frame and includes a pair of opposed arms. Each arm includes a first end and a second end. Each of the first ends of the arms is pivotally mounted about a pivot axis. Each of the second ends includes a hook for engaging the cot attachment. The arms are configured to prohibit the cot attachment from being released when the cot attachment applies a compression force on the hooks.

In one embodiment, the arms are biased toward each other by springs.

In another embodiment, each of the second ends of the arms is pivotally mounted about a pivot axis vertical relative to the frame. Further, each hook provides a bearing surface that is aligned with and orthogonal to the pivot axis of the respective arm so that normal pressure applied to the bearing surfaces of the hooks by the cot attachment will limit pivotal motion of the arms about their pivot axes.

In yet another embodiment, the system further includes a second restraint assembly for engaging a second cot attachment.

In yet a further embodiment, the cot fastening system includes a cot loading direction and a spring for biasing one of the cot attachments toward the first restraint assembly or the second restraint assembly in a direction opposed from the cot loading direction.

In one embodiment, the spring is for biasing the first cot attachment toward the first restraint assembly. Optionally, the second restraint assembly includes the spring, and optionally includes a second spring for biasing the first cot attachment toward the first restraint assembly in a direction opposed from the cot loading direction.

According to yet another embodiment, a cot fastening system for fastening a cot includes a frame configured for mounting to a floor of an emergency vehicle, a first restraint assembly for coupling to a foot end cot attachment of the cot, and a second restraint assembly for coupling to a head end cot attachment. The first restraint assembly and the second restraint assembly are mounted to the frame. The system further includes a guide member that extends along the longitudinal axis of the frame for guiding a cot safety bar of a cot and for maintaining the cot safety bar in a non-deployed position while the cot moves along at least a portion of the frame.

In one embodiment, the cot fastening system includes a channel member extending along the longitudinal axis, with the channel member forming the guide member.

In another embodiment, the cot fastening system further includes a first mount mounting the first restraint assembly to the frame and a second mount mounting the second restraint assembly to the frame. The guide member extends between the first and second mounts.

In yet another embodiment, the guide member extends beyond the second mount, with the guide member maintaining the safety bar in a non-deployed position while the head end of the cot moves past the second mount.

In a further embodiment, the guide member includes a second channel member.

In one embodiment, the guide member forms part of a cage, which is sized to receive an antler anchoring assembly therein.

In another embodiment, the frame is formed by a pair of elongated members. First portions of the elongated members are parallel, and second portions of the elongated members form an obtuse angle there between to form a guide section for guiding the cot and the head end attachment of the cot into alignment with the second restraint assembly.

In yet another embodiment, the cot fastening system further includes a spring for biasing the cot in a direction opposed from the cot loading direction, which biasing urges one of the cot attachments into engagement with a respective restraint assembly to thereby apply a preload on the respective restraint assembly.

In one embodiment, the second restraint assembly includes the spring.

According to another embodiment, a cot fastening system for fastening a cot includes an anchor assembly for mounting to a floor plate of a floor of an emergency vehicle. The floor plate has a channel with a plurality of anchor positions there along, and a quick release fastener for anchoring the anchor assembly to the floor plate. The quick release fastener extends through a portion of the anchor assembly and into the channel of the floor plate. The quick release fastener includes a knob assembly and a nut, with the knob assembly operable to rotate the nut from a first insertion orientation, wherein the nut can be inserted into the floor plate and the channel, to an engagement orientation wherein the nut is captured in the channel. The knob assembly is further operable to tighten the nut in the engagement orientation to thereby anchor the anchoring assembly to the floor plate.

In one embodiment, the knob assembly includes a threaded shaft extending into the nut.

In another embodiment, the nut includes a top side, a bottom side, and two opposed planar sides extending between the top and bottom sides.

In yet another embodiment, the nut further includes a pair of opposed non-planar sides extending between the two opposed planar sides and between the top and bottom sides, which are non-planar wherein the nut is asymmetrical.

In one aspect, the opposed non-planar sides may have planar portions.

DETAILED DESCRIPTION OF THE DRAWINGS

FIG. 2 is a left side elevation view of the fastening system of FIG. 1;

FIG. 3 is a right side elevation view of the cot fastening system of FIG. 1;

FIG. 13 is an enlarged fragmentary bottom view of a foot end restraint assembly;

FIG. 14 is a similar view to FIG. 13 illustrating the restraint assembly of FIG. 13 engaged with a foot end cot attachment;

FIG. 14A is an enlarged detail view illustrating the engagement between the foot end cot attachment and the latch of the restraint assembly FIG. 14;

FIG. 14B is an enlarged view of the button release for the latch of FIGS. 13 and 14;

FIG. 17 is a plan view of an anchor assembly fastening system;

FIG. 18 is a similar view to FIG. 17 with the floor plate removed;

DETAILED DESCRIPTION OF THE EMBODIMENTS

Figure 1:
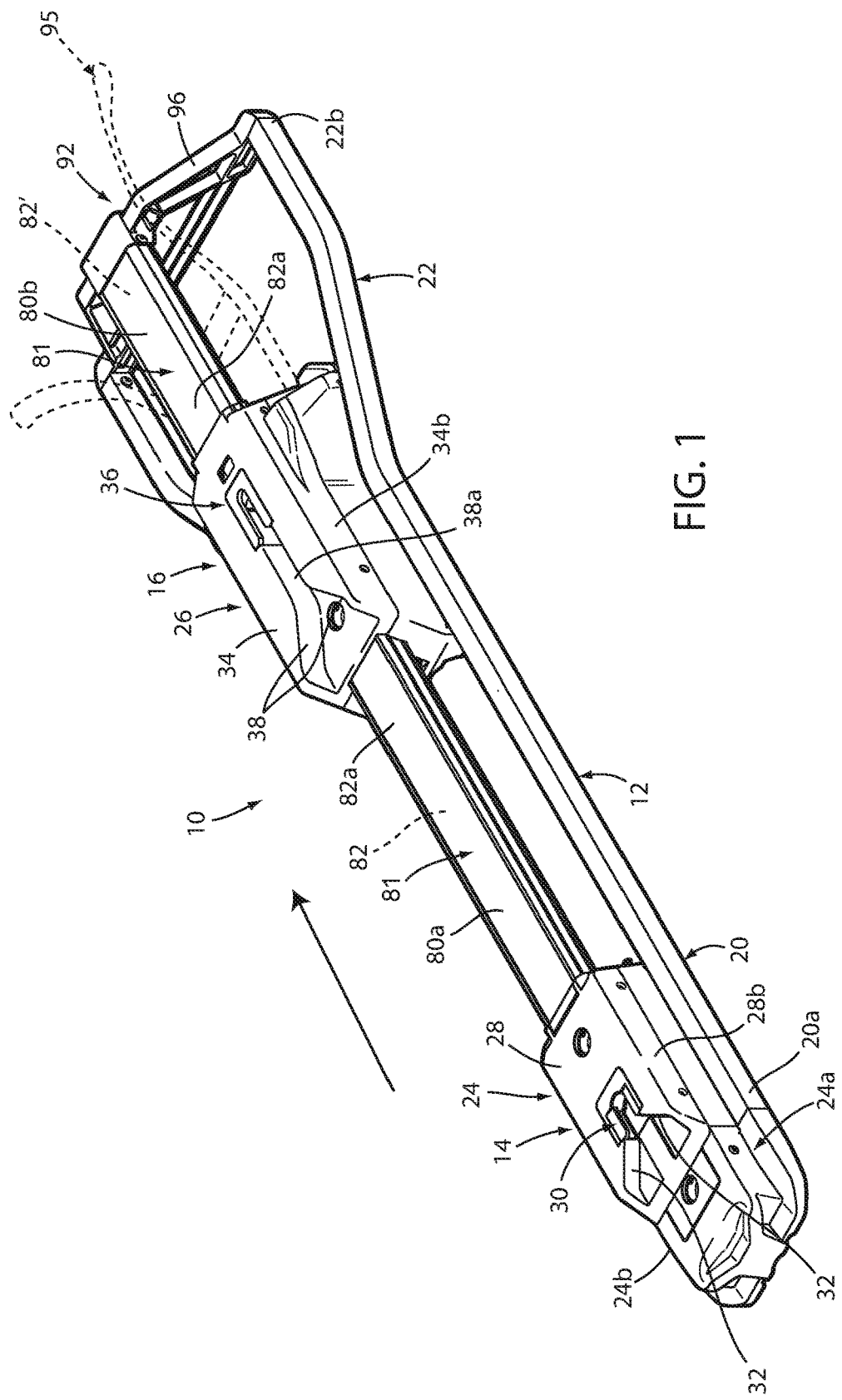
FIG. 1 is a perspective view of a cot fastening system.

Referring to FIG. 1, the numeral 10 generally designates a cot fastening system for mounting to the floor, such as to a floor plate mounted in the floor, of a compartment of an emergency vehicle. As will be more fully described below, in one embodiment, cot fastening system 10 is configured to allow an emergency cot to be inserted into the compartment of the emergency vehicle without the need for the cot to be precisely aligned with the fastening system 10, but which then precisely aligns the cot as the cot is pushed along fastening system 10 into the compartment so that the cot can be securely fastened in the compartment of the emergency vehicle. For examples of suitable cots that may be used with cot fastening system 10, reference is made to U.S. Pat. Nos. 6,908,133; 7,398,571; and 7,540,047, which are commonly owned by Stryker Corporation of Kalamazoo, Mich., and are incorporated herein by reference in their entireties.

Referring again to FIG. 1, cot fastening system 10 includes a frame 12, a first restraint assembly 14, which forms a foot-end restraint assembly, and a second restraint assembly 16, which forms a head-end restraint assembly, which are spaced along a longitudinal axis 12a (FIG. 7) of frame 12 and mounted to frame 12 to engage respective foot-end attachments and head-end attachments on a cot. Frame 12 is mounted to the floor of the emergency vehicle via fasteners that extend through weldments (described below) into the floor of the emergency vehicle, for example, optionally through a floor plate 18 (FIG. 17) mounted in the floor, described more fully below. First restraint assembly 14 and second restraint assembly 16 are configured to engage foot end and head end cot attachments (more fully described below in reference to FIGS. 13-16), respectively, of a cot to secure the cot to frame 12 when the cot is fully loaded in the loading direction onto frame 12. The loading direction of a cot onto cot fastening system 10 is indicated by the arrow in FIG. 1.

Figure 7:
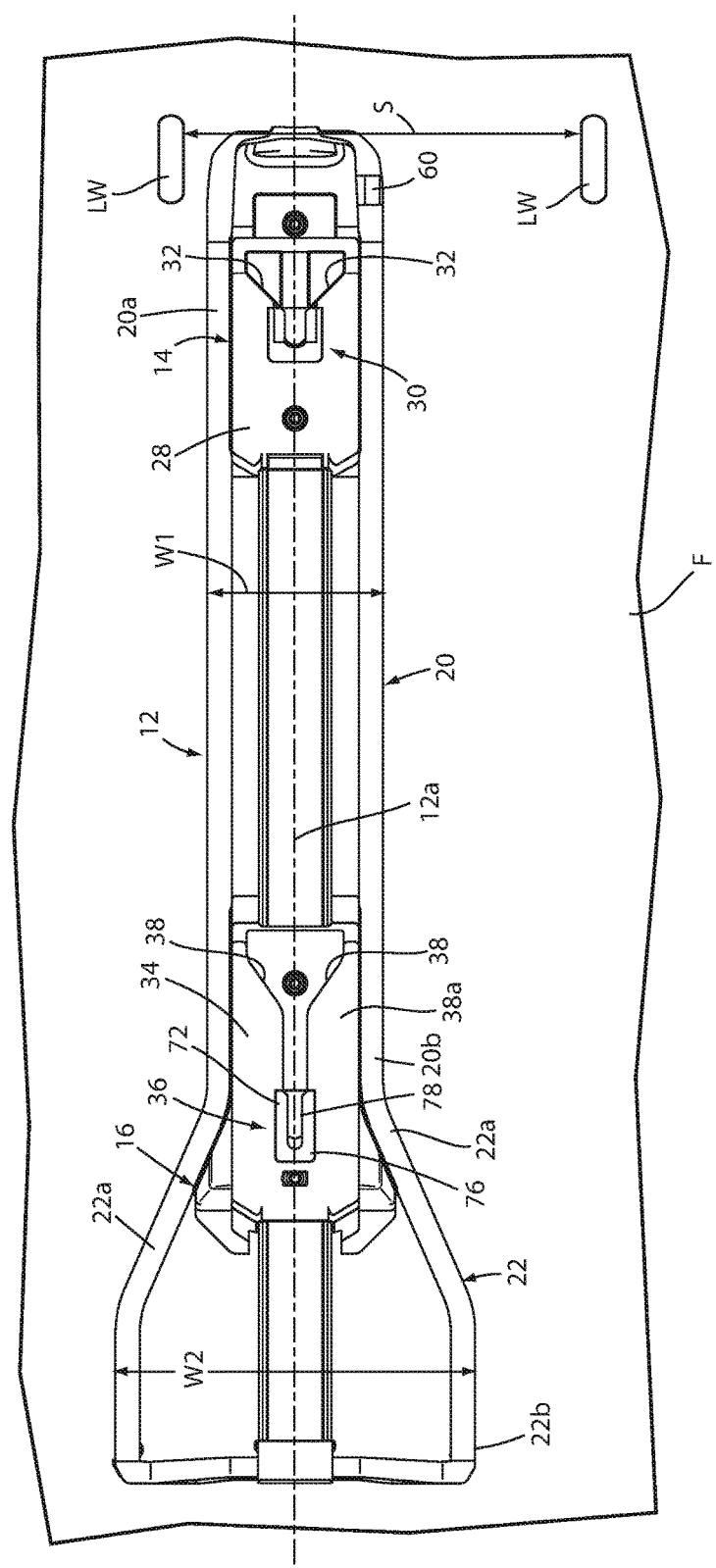
FIG. 7 is a similar view to FIG. 4 illustrating the location of cot load wheels of a cot relative to the cot fastening system.
Figure 8:
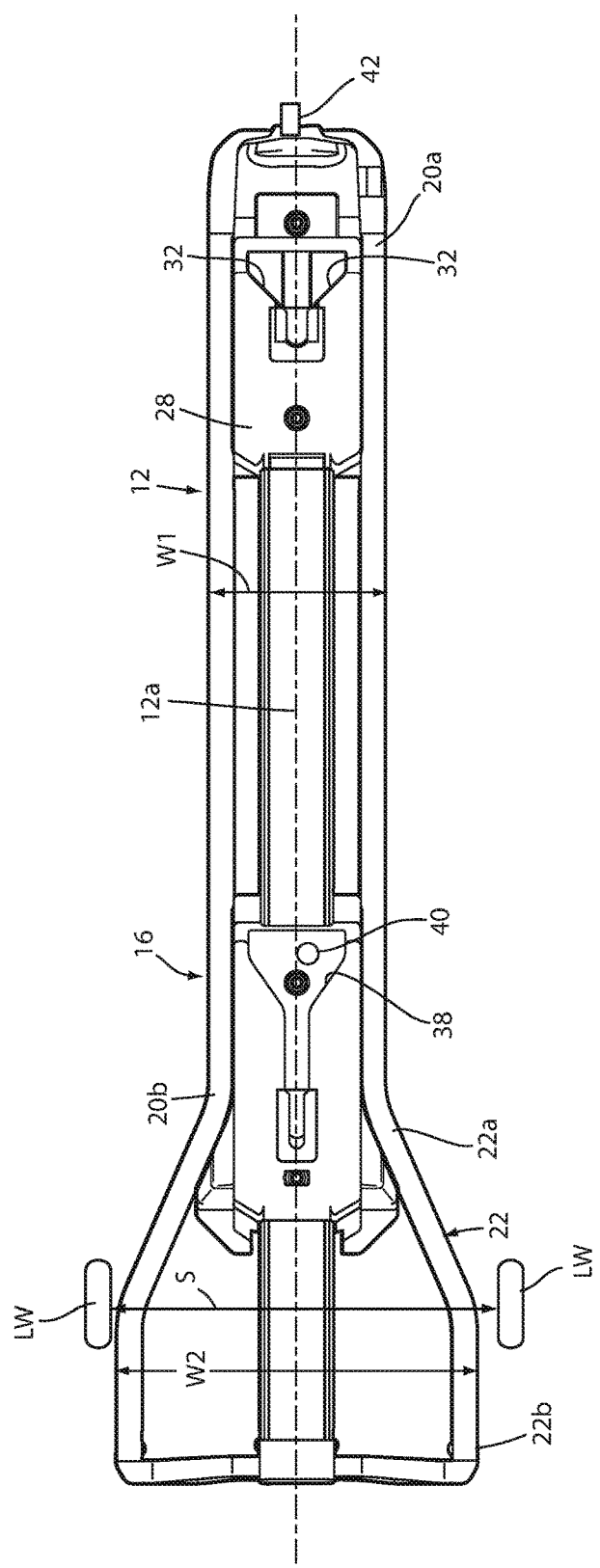
FIG. 8 is a similar view FIG. 7 illustrating the cot load wheels of the cot when the cot is partially loaded into the emergency vehicle.
Figure 9:
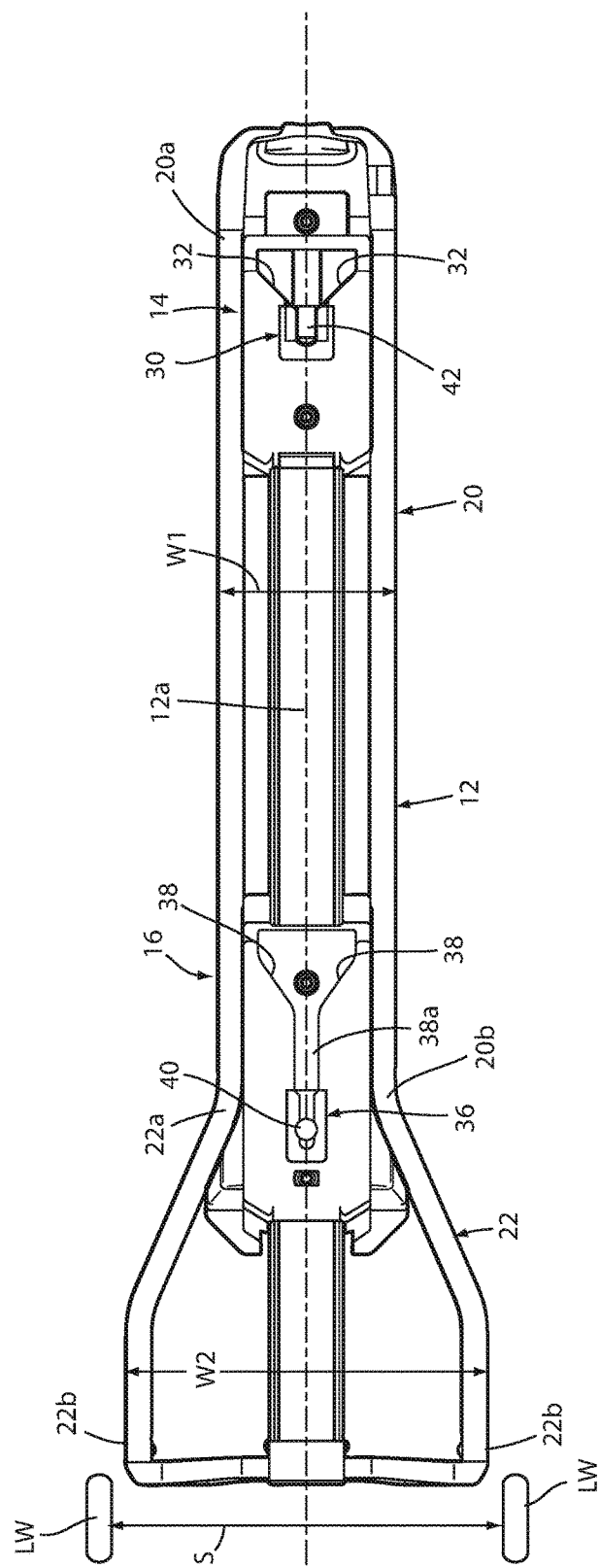
FIG. 9 is a similar view to FIG. 7 illustrating the cot load wheels in a fully loaded position.

Referring to FIGS. 7-9, frame 12 includes a first section 20 and a second section 22, which cooperate to guide the cot into the compartment of the emergency vehicle so that the respective cot attachments align with the respective restraint assemblies after the cot is already at least partially inserted into the emergency vehicle compartment. However, when the cot is first inserted into the compartment of the emergency vehicle, the first section 20 of frame 12 is configured so that the cot can straddle frame 12 but not necessarily be precisely aligned with the frame or any of the restraint assemblies. This facilitates the loading of a cot onto the fastening system.

Referring again to FIGS. 7-9, first section 20 of frame 12 has a width W1 which is less than the spacing S between the cot load wheels (LW) of the cot. Further, as will more fully described in reference to FIGS. 10-12, frame 12 has a height H that is less than the height of the underside of the cot deck so that when a cot is pushed into the emergency vehicle compartment in the loading direction, the cot can straddle frame 12. Thus, as understood from above, when a cot is first inserted into the compartment of the emergency vehicle and straddles frame 12, the cot need not be accurately aligned with the frame or restraint assemblies so that the location of the cot load wheels may be varied. This "course" alignment facilitates loading of the cot into the emergency vehicle and reduces the strain on emergency medical personnel who have to carry the weight of cot while it is being inserted into the emergency vehicle.

Referring again to FIGS. 7-9, second section 22 of frame 12, which extends from first section 20, expands or diverges away from the longitudinal axis 12a of frame 12 to a second width W2, which is greater than the first width W1. Second width W2 is approximately equal to, but optionally slightly less than, the spacing between the cot load wheels to form a guide for the cot load wheels as the cot is pushed further into the compartment in the loading direction. In this manner, frame 12 is configured to receive the cot and requires the cot only to straddle the frame initially, and then is configured to provide a general alignment of the cot with the restraint assemblies. As will be described below again in reference to FIGS. 7-9, the precise alignment of the cot attachments with the restraint assemblies is achieved by guide surfaces provided on the restraint assembly mounts.

Figure 4:
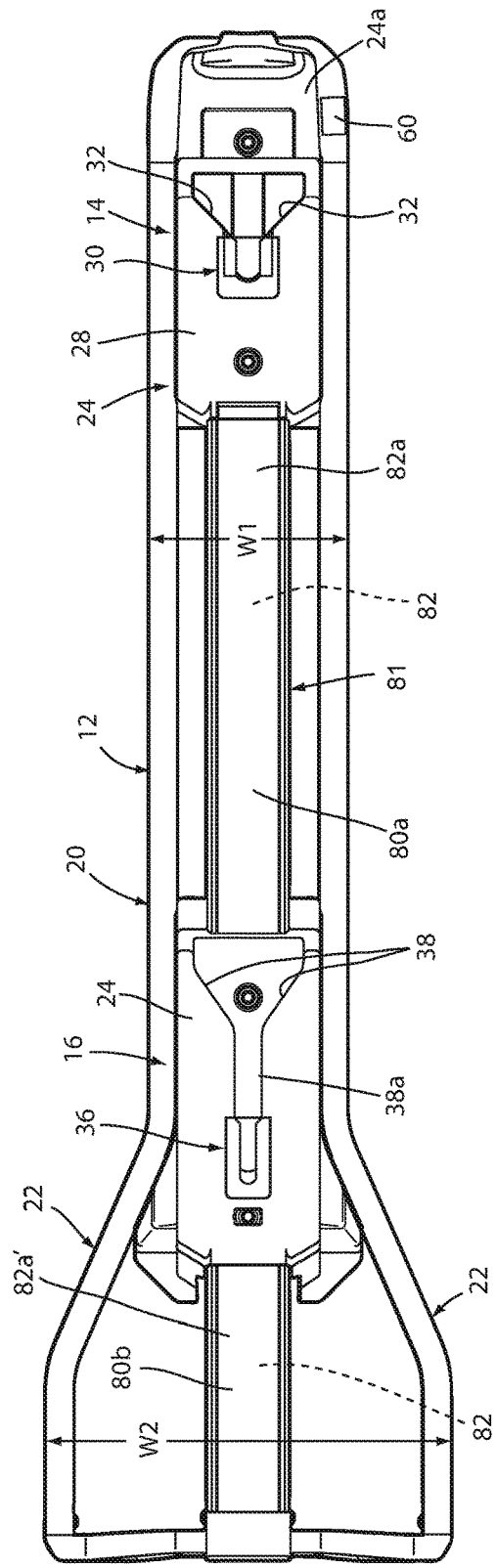
FIG. 4 is a top plan view of the cot fastening system of FIG. 1.

As best seen in FIG. 1, each restraint assembly 14, 16 includes a mount 24, 26. Mount 24 includes a body 28 that is mounted to frame 12 and comprises a generally block shaped housing that houses a latch 30. Further, as best seen in FIG. 4, body 28 is configured with angled surfaces 32 on either side of latch 30 to form a generally V-shaped arrangement of guide surfaces, which guide the foot end cot attachment into latch 30 of restraint assembly 14. Similarly, mount 26 includes a body 34 (FIG. 1) that is mounted to frame 12 and comprises a generally block shaped housing that houses a catch 36 and also provides angled surfaces 38 on either side of catch 36 to form a generally V-shaped arrangement of guide surfaces, which guide the head end cot attachment into catch 36. Further, guide surfaces 38 are spaced from catch 36 by a channel 38a to allow head end cot attachment to continue to move in the loading direction after being precisely aligned with catch 36, which facilitates alignment of foot end attachment with latch 30.

The locations of the mounts and their guide surfaces to the frame are selected so that the angled guide surfaces provide relatively precise alignment of the respective cot attachments with the respective latch and catch of restraint assemblies. In this manner, the frame provides a "course" alignment of the cot, while the mounts provide precise alignment of the cot with the respective catch and latch of the restraint assemblies.

Referring again to FIGS. 7-9, when the cot load wheels are placed on the floor F of the emergency vehicle and are positioned so they straddle frame 12, the location of frame 12 may be anywhere between the two load wheels. As the cot and load wheels are pushed further into the compartment, one of the load wheels will encounter second section 22 to pull the cot over and generally align the cot with frame 12 and, moreover, with first and second restraint assemblies 14 and 16 as the load wheels are pushed beyond the diverging sides of second section 22 adjacent the parallel sides of second section 22.

As best seen in FIG. 8, when the cot is almost fully inserted into the compartment and the load wheels have been guided past the diverging portion of second section 22 (so that the load wheels straddle the parallel sides of second section 22) which has a constant width, namely, width W2), the head end cot attachment 40 will be aligned with restraint assembly 16. As the cot is pushed further into the compartment, head end cot attachment 40 is then guided by angled surfaces 38 of mount 26 into channel 38a to precisely align with catch 36 of second restraint assembly 16.

In addition, the angle surfaces 38 of mount 26 together with frame 12 provide a general or "course" alignment for the foot end cot attachment 42 with respect to restraint assembly 14. As the load wheels move toward the head end of frame 12, and head end attachment enters restraint assembly 16 between guide surfaces 38 under the guidance of frame 12, foot end attachment 42 is aligned with restraint assembly 14. As noted above, mount 24 of first restraint assembly 14 also includes angled surfaces 32, which then provide a precise alignment for foot end cot attachment 42 with the latch 30 of first restraint assembly 14 as the cot moves further into the compartment along frame 12.

Referring to FIGS. 13, 14, and 14A, latch 30 includes a latch housing 46 and pair of arms 48, which are pivotally mounted about their first ends 48a in housing 46 about pivot axes 50 and are spring biased toward each other to a latched position (FIGS. 13 and 14) by a pair of springs 50a (FIG. 14). As will be more fully described below, latch 30 is configured to not release (i.e. when an operator actuates the release button 60 described below) when a pressure is applied in the unloading direction (e.g. from the weight of the cot).

Pivot axes 50 (FIGS. 13 and 14) are generally orthogonal to the loading direction so that arms 48 pivot in a plane that is generally parallel to the loading direction. Thus, pivot axes 50 are substantially vertical when frame 12 is mounted in the emergency vehicle, and the vehicle is substantially on a horizontal surface. Each arm 48 includes a second, hooked end 52, which forms a cam surface 54 on its outer end. In this manner, when foot end cot attachment 42 is pushed into latch 30, foot end cot attachment 42 will apply a force on cam surfaces 54, which will separate arms 48 against the bias force of the springs and allow foot end cot attachment 42 to pass between arms 48 and pass by the hooked ends of arms 48. Once attachment 42 has passed between arms 48 and passed by the hooked ends 52 of arms 48, arms 48 will return to their latched position, to thereby trap foot end cot attachment 42 in latch 30.

Additionally, hooked ends 52 of arms 48 are configured to keep the foot end attachment from being released when the hooked ends are contacted by or under pressure (indicated by the arrow in FIG. 14A) from attachment 42. In the illustrated embodiment, the arms' geometry will not allow the cot to be released when the cot attachment is contacting the hooked ends of arms 48. For example, as best seen in FIG. 14A, the arms are shaped so that when they are pivoted, the hooked ends move in the path indicated by the dotted lines in FIG. 14A. As such when attachment 42 is contacting hooked ends 52, the attachment 42 will interfere and block arms 48 from pivoting. Therefore, no matter how much release force is applied (other than a force that would break the latch, as would be understood), the arms of the latch will not release the cot attachment. Accordingly, when the cot is to be removed from the emergency vehicle, the cot must be pushed in the loading direction to unload the latch arms and move the cot attachment out of the path of the latch arms in order to release the latch. As will be more fully described below, by pushing the cot in the loading direction against the biasing force of springs 70 of restraint assembly 16, which urge cot attachment 42 into engagement with latch 30, springs 70 will be compressed to allow attachment 42 to disengage from and move away from the latch arms of latch 30, as noted above, so that latch 30 can then be released by the release mechanism.

A secondary factor that keeps latch 30 from unlatching when the foot end attachment 42 applies pressure to the hooked ends 54 is the friction between the attachment 42 and the hooked ends of the arms of the latch. When attachment 42 bears against the hooked ends of the arms, the pressure generates friction forces between attachment 42 and hooked ends 52 that will oppose a release force, which is generated by the release mechanism described below. Thus, when the hooked ends 52 of arms 48 are under pressure, the force to release the arms will be greater than when the arms are unloaded.

To prevent damage to the release mechanism, the release button may be configured to limit the amount of release force that can be applied to the latch. In the illustrated embodiment, the release mechanism is configured to prevent a release force from being applied to the latch arms that exceeds a selected threshold to prevent damage to the release mechanism. For example, the threshold may be a very low threshold of force applied to the latch arms, such as any force above zero, or may be a high threshold that is commensurate with the full weight of the cot bearing on the two latch arms, or somewhere in between.

Referring to FIG. 14B, as described above, to release restraint assembly 14, cot fastening system 10 includes a release mechanism, such as a release button 60. Release button 60 is mounted at or near the first end of frame 12 (see FIG. 4), and optionally slidably mounted adjacent mount 24 in a foot end housing 24a, which abuts mount 24 and ends 20a of first section 20 of frame 12.

Release button 60 is coupled to arms 48 of latch 30 by a linkage 62, which is configured to pivot arms 48 about their respective pivot axes away from their latched positions when button 60 is pushed. In order to limit the load that can be applied to the release mechanism (for example when the foot end cot attachment is applying pressure to the hooked ends of arms 48 so the latch won't release) button 60 is coupled to linkage 62 by way of an overload spring 64. In this manner, when a user pushes the release button 60 and the hooked ends 52 of arms 48 are contacting the foot end cot attachment (e.g. when the foot end cot attachment is applying pressure to the arms of the latch or when the foot end cot attachment is simply in contact with the hooked ends of the arms of the latch without applying pressure), the overload spring will compress, which limits the load that can be applied to the release mechanism, and the latch won't release. When the pressure on the latch arms of latch 30 is released and the attachment no longer blocks the arms of the latch from being released, the spring 64 will transmit a release force from the button 60 to the linkage 62 to thereby allow the latch arms to be moved to their unlatched position. This protects the release mechanism from being overloaded, for example, when an attendant tries to release the latch when the attachment 42 blocks the arms of the latch from releasing.

Figure 15:
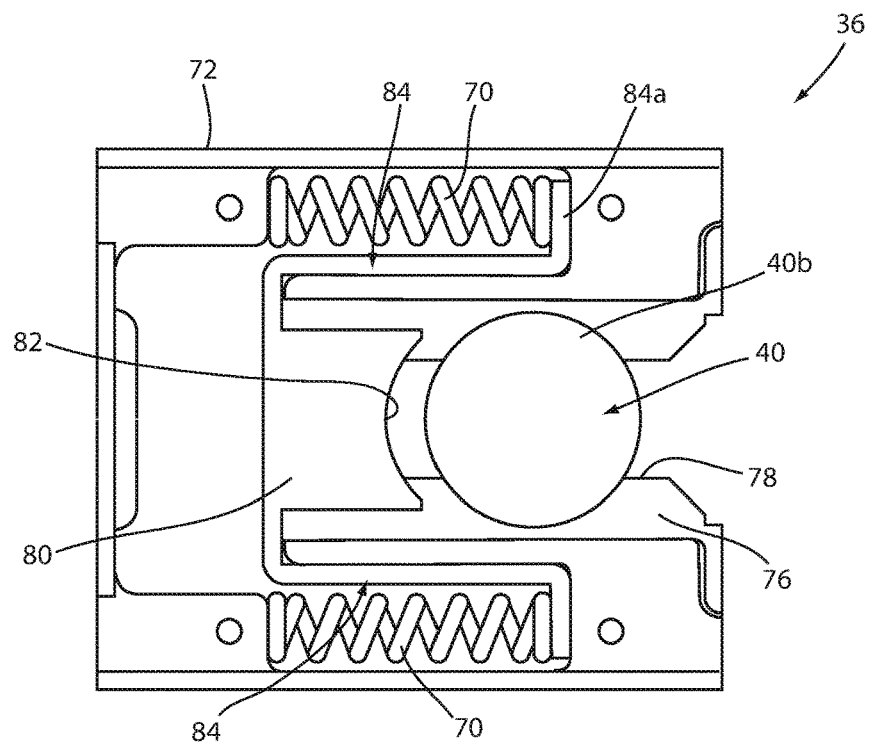
FIG. 15 is an enlarged bottom view of a head end restraint assembly illustrating a head end cot attachment aligned in the restraint assembly.
Figure 16:
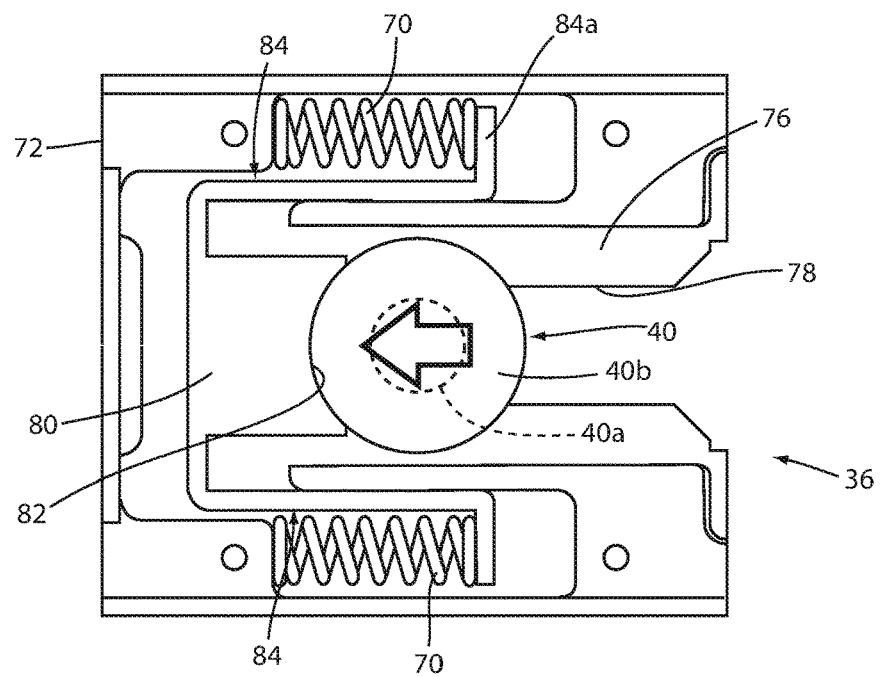
FIG. 16 is a similar view to FIG. 15 illustrating the head end cot attachment engaged with the restraint assembly.

In one embodiment, cot fastening system 10 includes one or more dampers to dampen the impact load from the cot when it is docked on the fastening system. Referring to FIGS. 15 and 16, cot fastening system 10 may include one or more dampers, for example, in the form of springs 70, as noted, to dampen the impact load of when the cot is docked and engaged with the restraint assemblies. Springs 70 provide a tighter fit between the cot and one or more of the respective restraint assemblies. For example, as noted above, springs 70 bias the cot attachment 42 toward the hooked ends of the latch arms of latch 30 to assure the cot is engaged by latch 30 when the cot is loaded onto frame 12 and, further, will not be unintentionally released, for example, if the release button is inadvertently pressed. Optionally, springs 70 may also be sized to absorb energy in a crash.

In the illustrated embodiment, springs 70 are incorporated in head end restraint assembly 16. As best seen in FIGS. 15 and 16, restraint assembly 16 includes a catch 36. Catch 36 includes a housing 72, which supports a plate 76 with a slotted opening 78 into which the head end cot attachment extends. In the illustrated embodiment, which is viewed from the bottom of catch 36 in FIGS. 15 and 16, head end cot attachment 40 (FIGS. 8 and 9) comprises a post 40a, which is smaller but commensurate in size with the slotted opening, and an enlarged end 40b (FIGS. 15 and 16) that is larger than slotted opening 78. For example, enlarged end 40b may comprise a disk. In this manner, when post 40a is pushed into slotted opening, attachment 40 is retained therein by enlarged end 40b, which rides along plate 76. Thus, plate 76 provides a vertical restraint for head end cot attachment 40 in restraint assembly 16 when attachment 40 is moved into slotted opening 78. In addition, when post 40a of head end cot attachment 40 is extended into opening 78, it is laterally coupled therein (in a direction orthogonal to the loading direction) by plate 76 and, further, as noted above vertically coupled therein by enlarged end 40b. Additionally, friction between enlarged end 40b and plate 76 may provide limited restraint along the cot loading direction. Thus, head end restraint assembly 16 forms a passive restraint.

Referring again to FIGS. 15 and 16, when head end cot attachment 40 enters restraint assembly 16, enlarged end 40b engages a second catch 80, which is coupled to springs 70. In the illustrated embodiment, catch 80 includes a seat 82 for receiving enlarged end 40b and a pair of arms 84 that are coupled to springs 70. Arms 84 are generally L-shaped with flanges 84a at their distal ends that are coupled to the ends of springs 70 so that when cot attachment 40 presses on seat 82, arms 84 will compress springs 70. As springs 70 compress, a load is generated on the cot in a direction opposed from the cot loading direction. This load is also applied to cot attachments 40 and 42, which provides a tight fit between cot attachment 42 and arms 48 of latch 30, and further creates a pre-load on latch 30 to, as noted, to prevent latch 30 from being released while the cot is applying pressure on latch 30. Further, springs 70 absorb at least some of the impact load generated by the cot when it is loaded on to frame and pushed into restraint 16. Additionally, springs 70 may be sized to absorb energy in a crash. It should be understood that the location and type of springs 70 may be varied, and include for example, torsion springs, extension springs, or leaf springs to achieve similar effect as discussed above.

Referring again to FIG. 1, in one embodiment, cot fastening system 10 includes a stationary frame 12 and one or more restraint assemblies, such as restraint assembly 14 and restraint assembly 16 described above, and one or more guides 81 for guiding the cot safety bar along the frame and maintaining a cot safety bar 90 (described below) in an un-deployed position so that it does not bind when the cot is being loaded onto or unloaded from the stationary frame.

Safety bars are devices that are used to prevent a cot from being uncontrollably deployed from a compartment of an emergency vehicle. Safety bars are formed by a bar, typically a U-shaped bar, which is pivotally mounted to the underside of the cot deck for movement between stowed positions, where the bar is folded under the cot deck, to a deployed position where it is extended from the cot deck to a position where it can engage a safety stop. However, when being loaded into the emergency vehicle compartment, or when being unloaded over frame 12, it is desirable to maintain the safety bar in a non-deployed position until such time that the safety bar's deployment is needed, i.e., when the cot is unloaded from fastening system 10 but still has wheels engaged with the floor of the emergency vehicle compartment.

Figure 10:
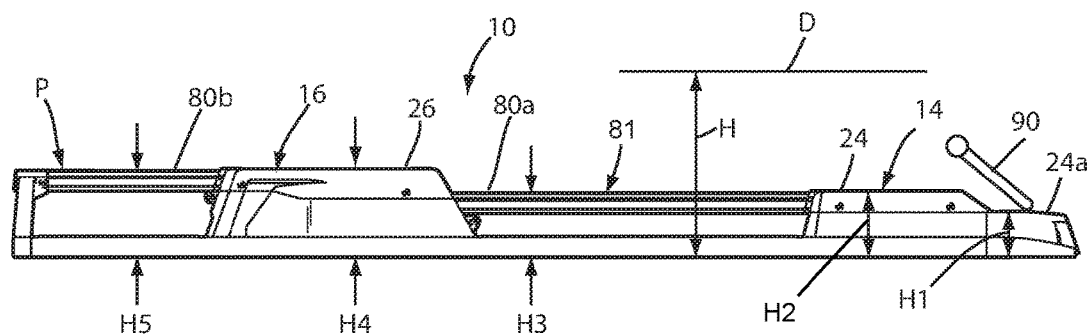
FIG. 10 is a side elevation view of a cot fastening system illustrating the profile of the fastening system and the position of a safety bar of a cot relative to the cot fastening system profile.
Figure 11:
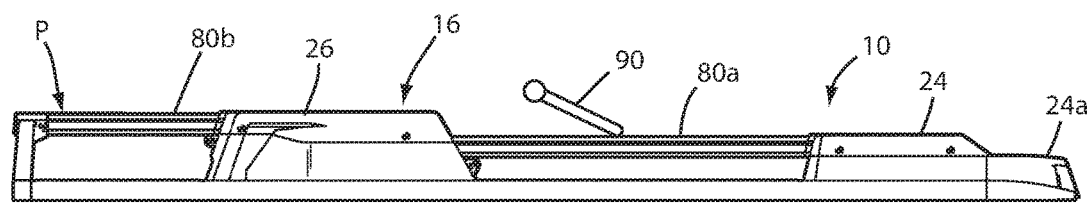
FIG. 11 is a similar view to FIG. 10 illustrating the safety bar being guided by the cot fasting system when the cot is in a partially loaded position.
Figure 12:
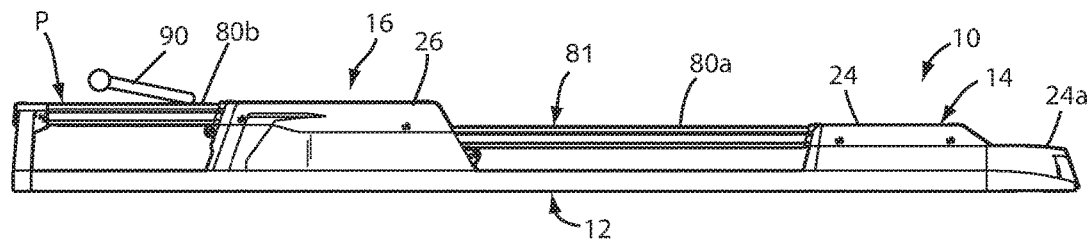
FIG. 12 is a similar view to FIG. 11 illustrating the orientation of the safety bar when the cot is fully loaded into the emergency vehicle.

As best seen in FIGS. 10-12, system 10 has a profile P that is sufficiently low enough to allow a cot to straddle frame 10 but is sufficiently high enough to apply an upward force on the safety bar 90 to maintain it in a non-deployed position while a cot is moved along frame 12.

In the illustrated embodiment, guide 81 includes a first guide member 80a that is provided between first restraint assembly 14 and second restraint assembly 16. For example, guide member 80a may comprise an inverted channel 82 that extends between and is coupled at its respective ends to mounts 24 and 26. Further, guide member 80a may include a low friction surface, such as a plastic cover 82a or the like, to reduce the friction between the safety bar 90 and guide member 80a. Optionally, guide member 80a may extend beyond head end restraint assembly, for example, through mount 26 to the head end of frame 12 to form a guide beyond restraint assembly 16. Alternately, as shown, system 10 may include a second guide member 80b that extends from second restraint assembly mount 26 to the head end of frame. The second guide member may also be formed from an inverted channel 82' with a plastic cover 82a' (e.g. FIGS. 1 and 5).

Thus, starting with the foot end of frame 12, safety bar 90 initially encounters foot end housing 24a, which has a height H1, which is less than the height H of the cot deck, but sufficiently high enough to maintain safety bar 90 from extending to its deployed position, i.e., from pivoting to an orthogonal orientation relation to the cot deck.

As the head end of the cot is pushed into the compartment, safety bar 90 will next encounter mount 24, which has a height H2, which is less than H, but greater than H1 and also, therefore, sufficiently high enough to maintain safety bar 90 in a non-deployed position. As the cot is pushed further over frame 12, safety bar 90 will then encounter guide member 80a, then mount 26, and then finally second guide member 80b (or the extension of guide member 80a), each with a height H3, H4, and H5, respectively, that is less than H but high enough to maintain safety bar 90 in a non-deployed position.

Optionally, frame 12 may be mounted to a floor plate (such as described in reference to FIGS. 17-22), with the floor plate incorporating a safety stop for engagement by safety bar 90 when the cot is unloaded from frame 12.

Referring again to FIG. 1, optionally, in one embodiment, frame 12 and guide member 80b (or extension of member 80a) form a cage 92 for mounting over an antler anchoring assembly 95 (FIG. 1). For example, in the illustrated embodiment, cage 92 is formed by guide member 80b and second section 22 of frame 12, which are joined by an end support 96. Together, guide member 80b, second section 22, and end support 96 form an open frame or cage that is sized to straddle and extend over antler anchoring assembly 95. In this manner, system 10 may be used in combination with an anchoring assembly, such as an antler anchoring assembly, but without necessarily being joined with or coupled to the antler anchoring assembly, and instead with each being independently mounted to the floor of an emergency vehicle. Optionally, system 10 and antler anchoring assembly 95 may be both commonly mounted to the floor via a floor plate, such as the floor plate shown and described in reference to FIGS. 17-22 below.

Figure 6:
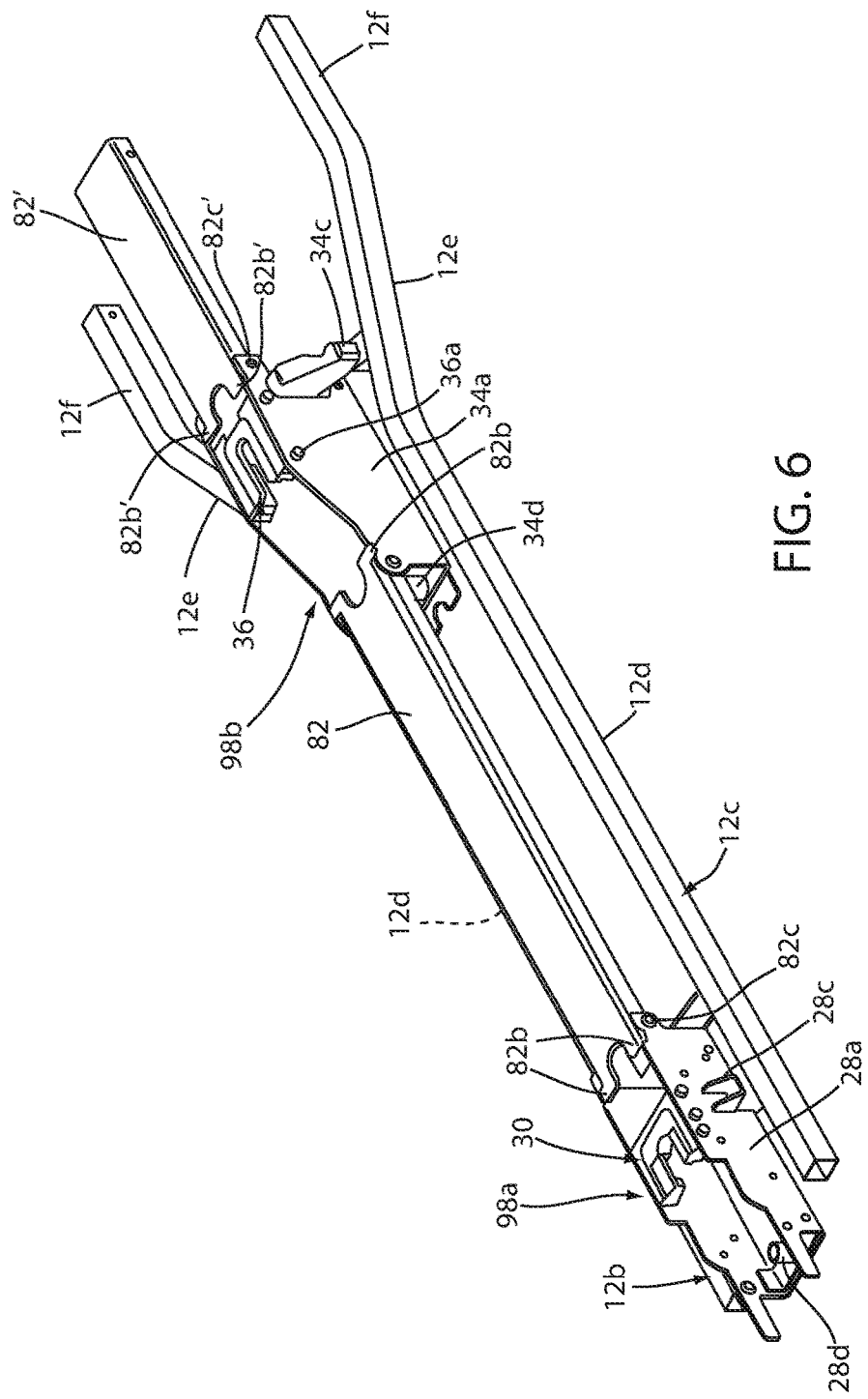
FIG. 6 is a top perspective view of the framework of the fastening system of FIG. 1.

Many of the components of system 10 may be formed from metal or plastic or a combination of both. Referring to FIG. 6, frame 12 may be formed from spaced, elongated members 12b, 12c, namely tubular members, such as metal tubular members, that are each formed, such as by bending, into three portions—with the first portions 12d forming first section 20 of frame where the tubular members are parallel, the second portions 12e forming the diverging portion of second section 22, and the third portions 12f forming the parallel portion of second section 22.

Figure 5:
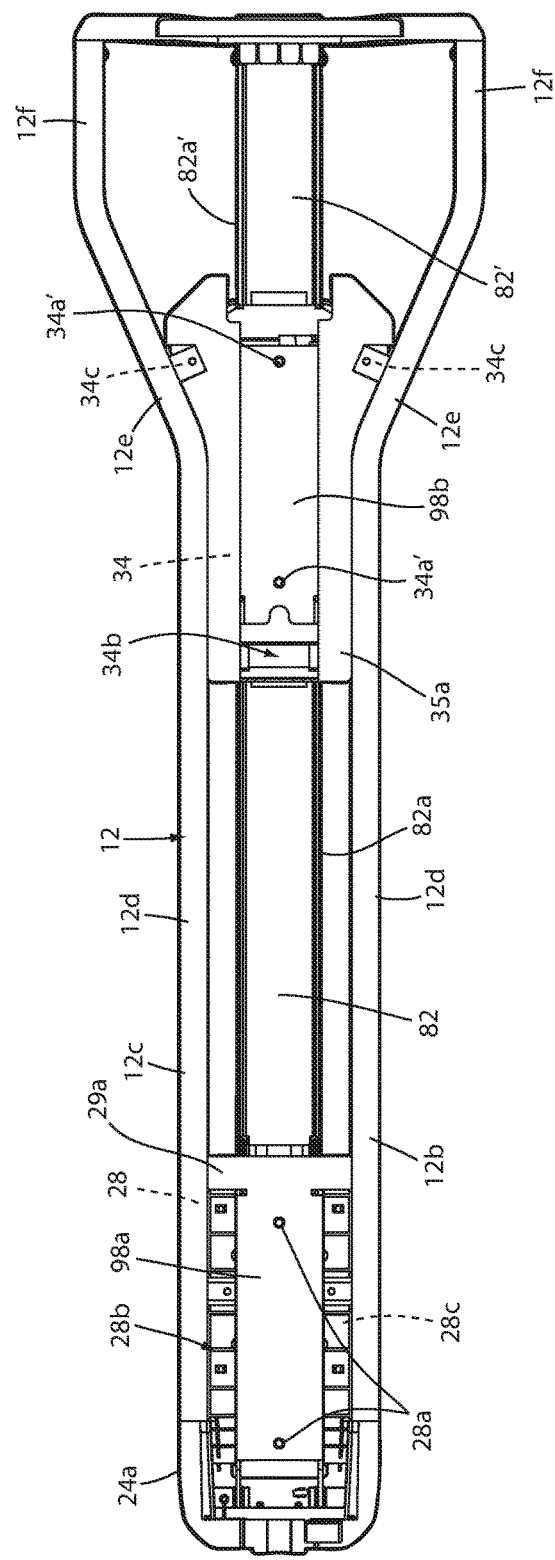
FIG. 5 is a bottom plan view of the cot fastening system of FIG. 1.

Referring to FIGS. 5 and 6, tubular members 12b, 12c are joined together in their spaced relationship by foot-end and head-end weldments 98a and 98b. Weldments 98a and 98b are joined to tubular members 12b, 12c, such as by welding, to form frame 12 and provide mounts for fastening frame 12 to the floor of the emergency vehicle via fasteners (shown in reference to the bolt holders illustrated in FIGS. 23-27). Weldments 98a, 98b include generally upwardly extending U-shaped frames 28a and 34a with mounting flanges 29a and 35a, which mount weldments 98a, 98b to frame members 12b, 12c, for example, by welds. Weldments 98a and 98b are covered and enclosed by plastic covers 24b, 28b, and 34b (FIG. 1), which together form housing 24a and bodies 28 and 34 of mounts 24 and 26, respectively.

Weldments 98a and 98b may be directly mounted to the floor, for example, via a floor plate in the floor. Thus, the surrounding frames may be secured to the floor by attachment to the weldments 98a and 98b, and without needing to be fastened directly to the floor. Additional mechanical mechanisms, such as fasteners, however, can be added to secure the surrounding frames to the floor directly. By directly fastening the weldments (which provide the mounting structures for the latch assemblies as described below) to the floor (e.g. to the floor plate of the floor), cot fastening apparatus 10 is anchored and, therefore, strong where the greatest impact load will likely occur, namely at the restraint assemblies, and those impact loads will be transferred directly to the floor.

As noted above, latch 30 and catch 36 of restraint assemblies 14 and 16 are mounted to frames 28a, 34a, respectively, by one or more fasteners 30a, 36a (FIG. 6). Alternately, latch 30 and catch 36 may be secured by welding. Frames 28a and 34a are mounted to tubular members 12b, 12c by mounting assemblies 28c, 34c (partially shown), respectively, which in the illustrated embodiment comprise brackets and fasteners. Alternately, frames 28a and 34a may be welded to tubular members 12b, 12c, respectively. Similarly, frames 28a and 34a provide mounts for channels 82, 82', which form guide surfaces more fully described below.

In the illustrated embodiment, channels 82 and 82' are mounted to frames 28a and 34a by locating tabs 82b and 82b' and fasteners 82c and 82c'. Again, optionally, channels 82, 82' may be welded to frames 28a and 34a. Further, weldments 98a and 98b include through holes or openings 28a' and 34a' (shown in FIG. 5) for receiving the fasteners (only plastic guide posts 28d, 34d that guide the fasteners are shown in FIG. 6—see FIG. 24 for an illustration of a fastener that maybe be used to anchor the weldments to the floor) that secure frame 12 to the floor of the emergency vehicle. In the illustrated embodiment, there are two fasteners per weldment to secure the weldments to the floor, for example to a floor plate in the floor. For example, one or more of the fasteners may comprise the fasteners described below, including fasteners that engage a cleat in a floor plate or a quick release fastener that engages the floor plate directly. However, it should be understood that the number of fasteners may be adjusted.

Thus, the frame of cot fastening system 10 has a metal structure skeleton, which is covered by one or more plastic covers, which provide aesthetic functionality, as well as low wear surfaces.

Figure 18A:
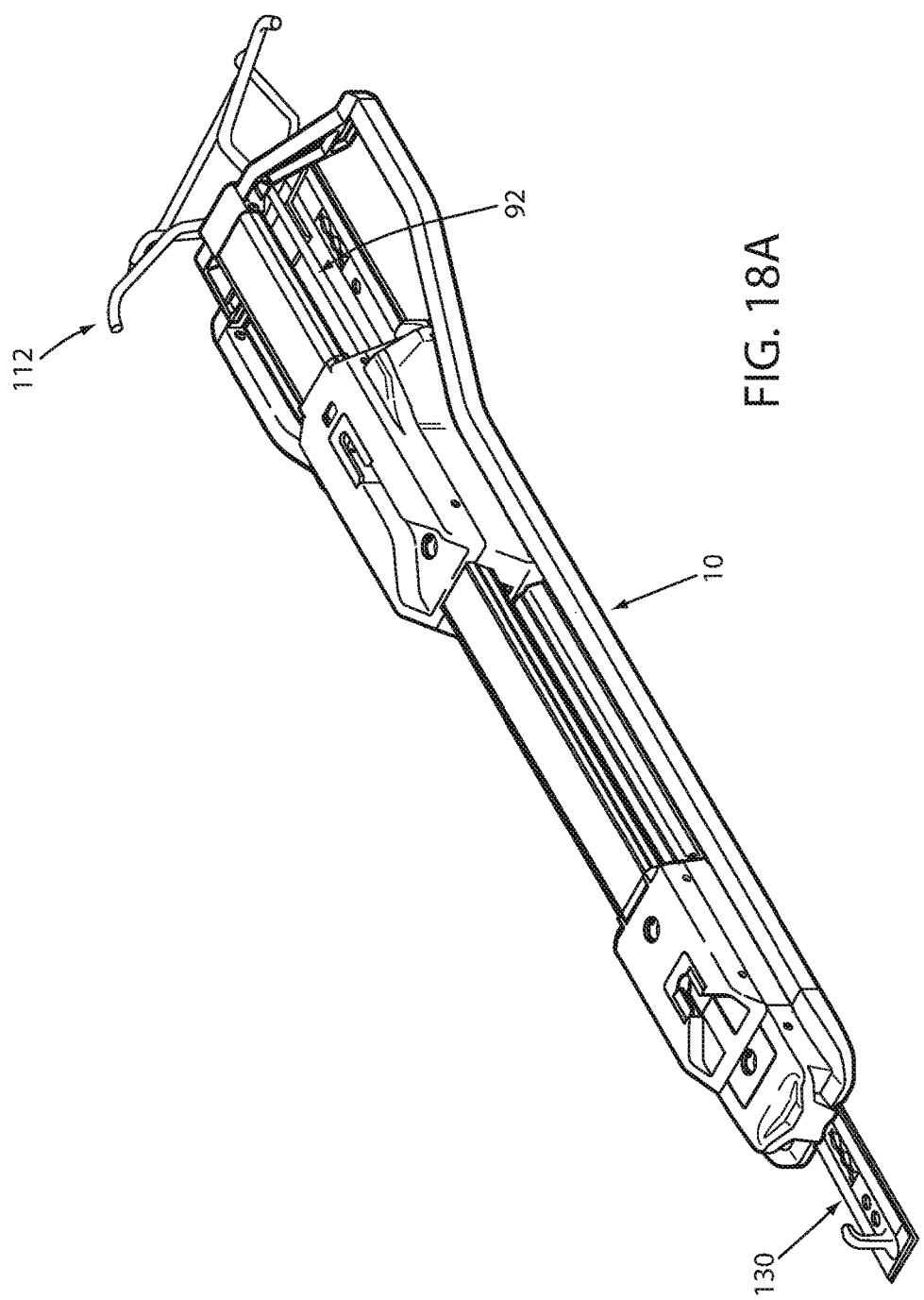
FIG. 18A is a perspective view of the anchor assembly fastening system of FIGS. 17 and 18 shown mounted adjacent the cot fastening system of FIG. 1.

As best seen in FIGS. 17-18, an antler anchor assembly 112 is illustrated. Referring to FIG. 18A, as noted, cot fastening system 10 may be used in conjunction with an anchoring assembly, such as an antler anchor assembly 112, which is similar to antler anchoring assembly 95 (shown in phantom in FIG. 1). Antler anchor assembly 112 may be aligned in cage 92 of cot fastening system 10, but not connected to frame 12 and instead mounted to the floor, including the floor plate, as described below. Alternately, antler anchor assembly 112 may be used alone.

Referring again to FIGS. 17-18, antler anchor assembly 112 is formed from tubular members 114, 116, and 118 that are arranged and joined together to form a rigid frame 120 (FIG. 18) and provide attachment locations for securing a cot. For examples of suitable antler anchor assemblies reference is made to U.S. Pat. No. 7,887,113, which is commonly owned by Stryker Corporation of Kalamazoo, Mich., and is incorporated herein by reference in its entirety. Further, suitable antler anchor assemblies are available from Stryker Corporation of Kalamazoo, Mich.

In addition to tubular members 114, 116, and 118, antler anchor assembly 112 includes two plates 122 (FIGS. 17 and 18), which join tubular members 114 with tubular member 116 and join the ends of tubular members 114 together in a spaced parallel relationship. Further, plates 122 provide attachment points for securing antler anchor assembly 112 in place.

In the illustrated embodiment, antler anchor assembly 112 is mounted to the floor of an emergency vehicle by way of a floor plate 130, which is mounted in the floor. Floor plate 130 is mounted in the floor of the emergency vehicle and includes a channel 132 that is recessed into the floor. Antler anchor assembly 112 is releasably mounted to floor plate 130 via one or more fasteners 134, which extend through plates 122 and into channel 132 of floor plate 130.

Figure 19:
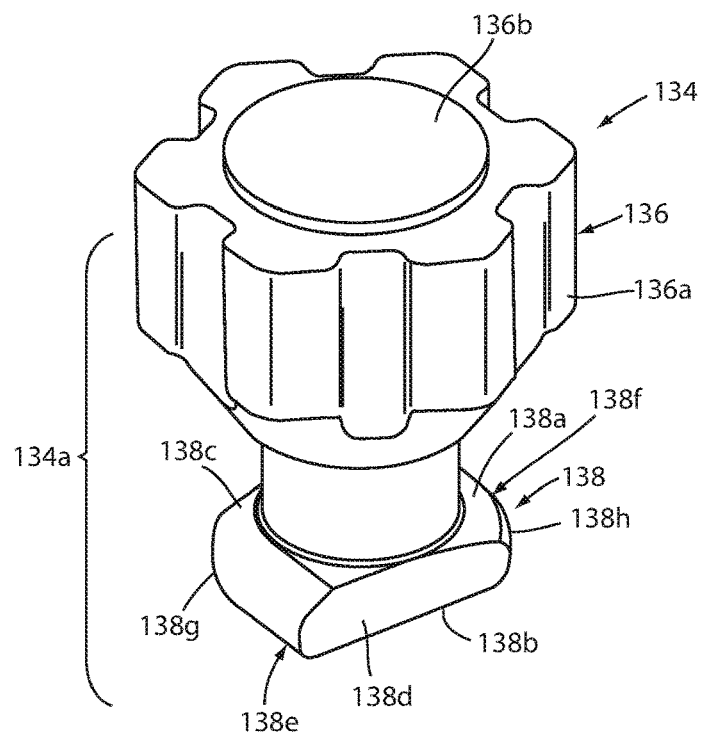
FIG. 19 is an enlarged perspective view of a quick lock fastener of the fastening system of FIGS. 17 and 18.
Figure 19A:
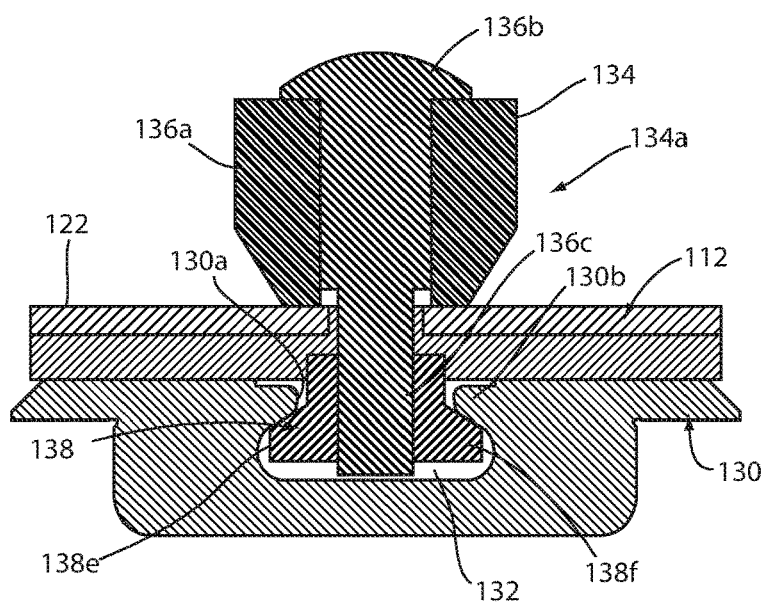
FIG. 19A is a cross-section view taken through the quick lock fastener a FIG. 19 when mounted in the floor plate.
Figure 22:
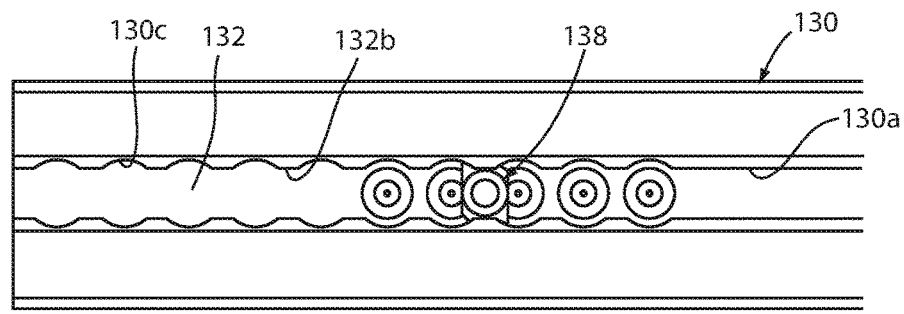
FIG. 22 is a similar view to FIGS. 20 and 21 illustrating the nut rotated to the locked orientation in the floor plate channel.

Referring to FIGS. 19 and 19A, in the illustrated embodiment, at least one of the fasteners 134 comprises a quick release fastener 134a, which extends through plates 122 and into channel 132 of floor plate 130. Fastener 134a includes a knob assembly 136 and a nut 138, to provide the quick release function described below. Nut 138 is configured so that it can be inserted through the opening 130a in floor plate 130 into channel 132 and, further, to engage the floor plate 130 when it is rotated from its insertion orientation (FIG. 20) to its locked position (FIG. 22).

In the illustrated embodiment, nut 138 includes a top surface 138a, a bottom surface 138b, and two opposed planar sides 138c, 138d that extend from top surface 138a to bottom surface 138b. Sides 138c, 138d are spaced so that they can pass through opening 130a of floor plate 130 when nut 138 is in its insertion orientation. Nut 138 also includes opposed sides 138e and 138f, which extend from top surface 138a to bottom surface 138b and between opposed sides 138c and 138d. While sides 138c and 138d are planar, sides 138e and 138f are non-planar, though they may have planar portions. Further, sides 138e and 138f include angled or curved portions 138g and 138h on opposed ends from each other so that they can be rotated in a clockwise direction as viewed in FIGS. 20-21 without binding against the wall of channel 132 but still provide a sufficient width to engage flanges 130b (which define opening 130a into channel 132) of floor plate 130. In this manner, nut 138 is not symmetrical—in other words, it is asymmetrical.

Referring again to FIG. 19A, knob assembly 136 includes a knob 136a and a post 136b about which knob 136a is mounted and further keyed to so that as knob 136a is rotated so too is post 136b. Nut 138 is mounted to a thread portion 136c of post 136b so that when nut 138 is aligned in channel 132 and rotated to its locked position (FIG. 22), rotation of knob 136a will cause nut 138 to engage and tighten against flange 130b of floor plate 130.

Optionally, antler anchor assembly 112 is anchored to floor plate 130 by one quick release fastener 134a that extends into channel 132 and engages floor plate 130, and one fastener 134 that does not include the nut 138, which instead extends into and engages a cleat 140 located in floor plate 130. However, antler anchor assembly 112 maybe secured using more than one quick release fastener.

In the illustrated embodiment cleat 140 includes a plurality of links 140a, which are coupled together, and a plurality of projections 140b, which project outwardly and laterally from links 140a. As will be more fully described below, projections 140b are sized and arranged to allow cleat 140 to be inserted into the floor plate 130 but then to capture cleat 140 in floor plate 130 so that cleat may provide a mounting surface for receiving fasteners 134.

Figure 20:
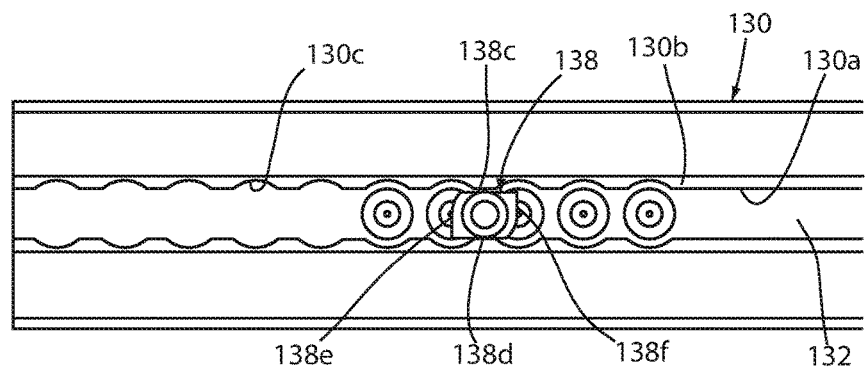
FIG. 20 is an enlarged fragmentary plan view of the quick lock fastener when inserted into the floor plate with the nut in an insertion orientation.
Figure 21:
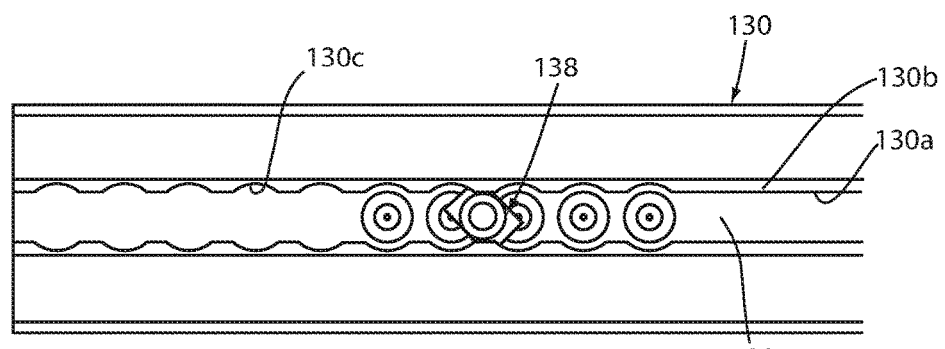
FIG. 21 is a similar view to FIG. 20 illustrating the nut rotated to engage the floor plate channel.

As best seen in FIGS. 20-22, flange 130b of floor plate 130 includes a plurality of notches 130c, which are commensurate in size and spacing with projections 140b on cleat 140. In this manner, when cleat 140 is located over floor plate 130 so that projections 140b align with notches 130c, cleat 140 may be then inserted into channel 132. Once inserted, at least a portion of cleat 140 may be moved just enough so that the projections are no longer aligned with the notches 130c or moved to a region of floor plate 130 where flange 130b no longer includes notches 130c to thereby capture the cleat in the floor plate. Thus, cleat 140 is movable relative to floor plate 130 and provides adjustability for the location of floor mount 112. Further, links 140a may include openings 140c for receiving fasteners, such as fastener 134 (but as noted without the nut). To limit longitudinal movement of cleat 140 along floor plate 130, washers (not shown), which are commensurate in size with the space between two opposed notches 130c, may be mounted to one or more links 140a via fasteners and located between a pair of opposed notches 130c.

Further, as generally noted above, cot fastening system 10 may be secured to the floor via floor plate 130. For example, the head-end weldment 98b may be mounted to floor plate 130 via two fasteners 134, which engage and secure weldment 98b to cleat 140 or another cleat located in floor plate 130, while the foot end weldment 98a may be secured to floor plate 130 directly via quick release fasteners 134a. Thus, optionally, the anchor assembly 112 may be mounted to the same cleat 140 as cot fastening system 10.

Figure 23:
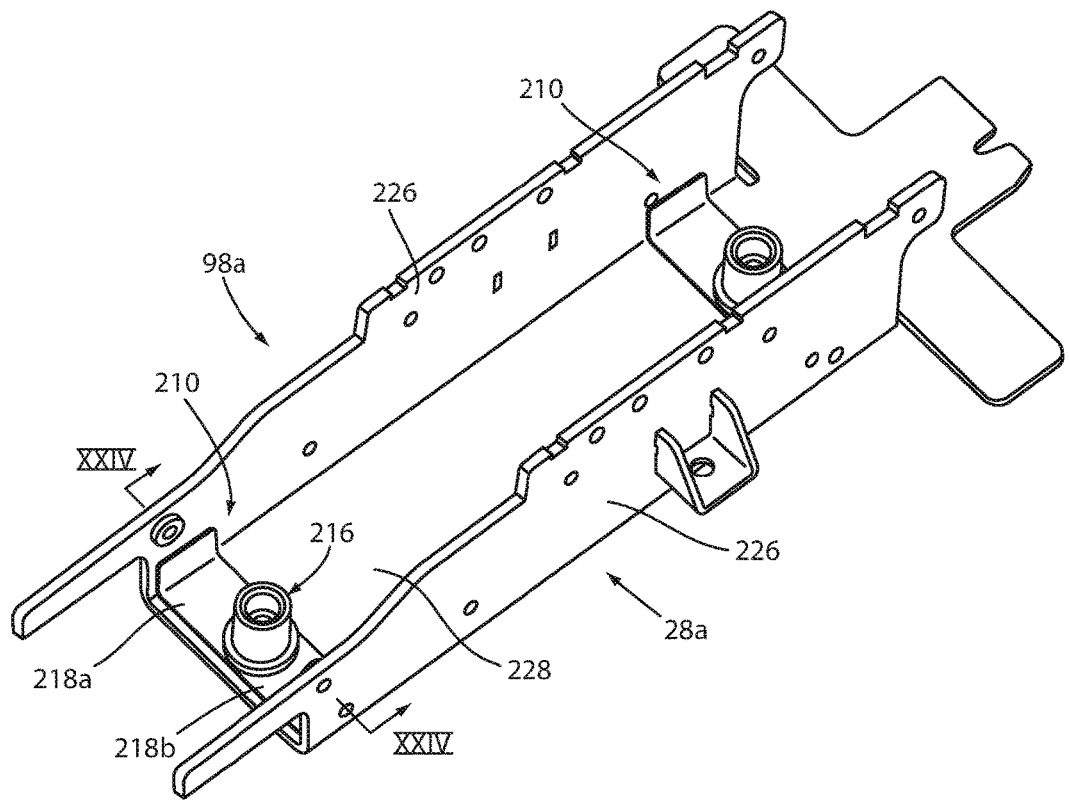
FIG. 23 is an enlarged perspective view of the foot end weldment incorporating two bolt holders.

Referring to FIG. 23, the numeral 210 designates a bolt holder that may be used to hold one or more of the mounting fasteners 212 that secure the foot or head end weldment 98a or 98b to the floor of a compartment of an emergency vehicle. As will be more fully described below, bolt holders 210 are each configured so that they hold the fasteners 212 and optionally their respective washers 212a in place when cot fastening system 10 is unfastened from the floor for adjustment, etc. By holding the fastener and, optionally, the washer when the weldment is repositioned for securing to the floor, the fasteners and washers will remain with the weldment and, further, will be substantially aligned for later engagement with the floor.

Referring again to FIG. 23, bolt holder 210 includes a cylindrical sleeve 216 that has a passageway 216a with an inner diameter that is sized to receive fastener 212. Further, sleeve 216 includes an upper annular flange 216b, which retains the fastener in the sleeve so that fastener 212 cannot pass through the open upper end of sleeve 216. In addition, the height of cylindrical sleeve 216 is optionally shorter than the height of the fastener so that even when the fastener is fully disengaged from the floor (F) and the weldment is moved or lifted up (e.g. when it is moved for adjustment) fastener 212 can remain in sleeve 216 with its lower end still aligned in the opening in the weldment 98a or 98b. Thus, the fastener 212 is generally held in position so that it will generally stay aligned in the openings in the weldment when the weldment is released from the floor so that they can be quickly aligned with the openings in the floor when the weldment is realigned with another set of mounting openings (typically there are two openings per weldment and multiple mounting openings in the floor).

In the illustrated embodiment, cylindrical sleeve 216 has a passageway 216a with a circular cross-section but it should be understood that passageway 216a may have a multi-sided cross-section, such as a square, pentagon, hexagon, etc., provided that it is sized to generally maintain the fastener in its vertical position within the sleeve.

Figure 24:
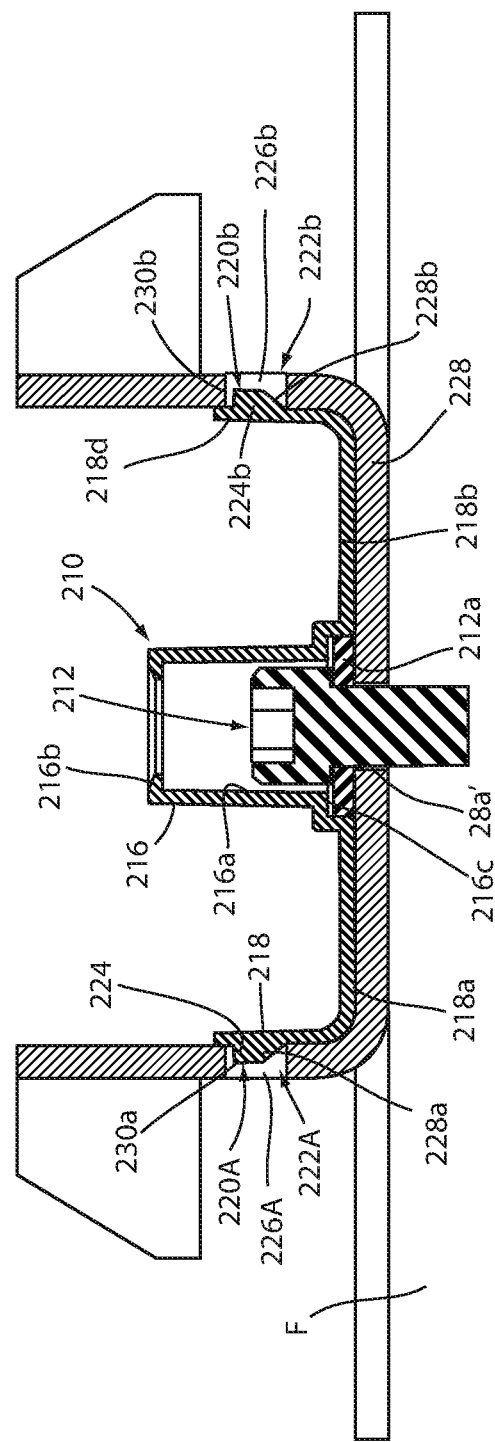
FIG. 24 is an enlarged cross-section view taken along line XXIV-XXIV of FIG. 23.

As will be described below, sleeve 216 is configured to mount in the respective weldment. In the illustrated embodiment, bolt holder 210 includes a pair of laterally or outwardly extending arms 218a, 218b that extend laterally or outwardly from sleeve 216, which are adapted to engage the respective weldment (in the illustrated is case weldment 98a). Referring to FIG. 24, arms 218a, 218b each optionally include an engagement structure 220a, 220b for engaging a corresponding structure 222a, 222b formed in weldment 98a.

In the illustrated embodiment, engagement structures 220a, 220b comprise detents 224a, 224b, respectfully, and the corresponding structures 222a, 222b comprise recesses 226a, 226b formed in sides 226 of weldment 98a.

Further in the illustrated embodiment, engagement structures 220a, 220b are provided on upwardly extending ends or portions 218c, 218d of arms 218a, 218b. Arms 218a, 218b are sized to extend the full width of the web 228 of weldment 98a so that engagement structures 220a, 220b are positioned to engage recesses 222a, 222b, which are located in the upwardly extending opposed sides 226 of upwardly extending u-shaped frame 28a that forms weldment 98a.

Figure 25:
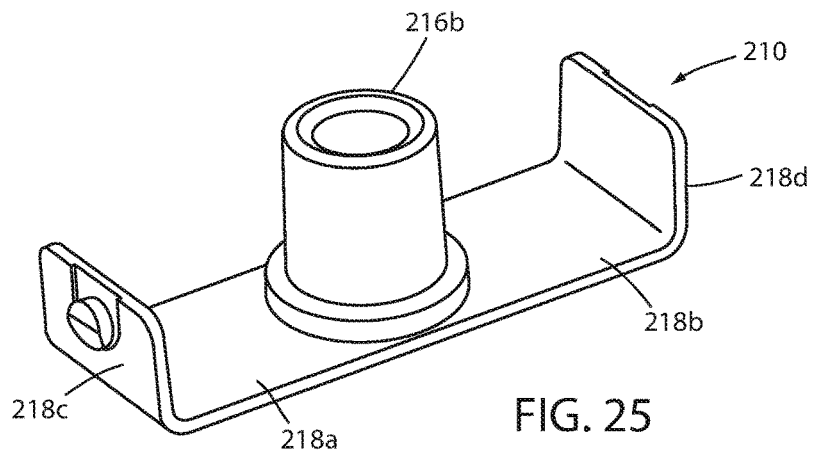
FIG. 25 is an enlarged perspective view of one of the bolt holders shown in FIG. 23.
Figure 26:
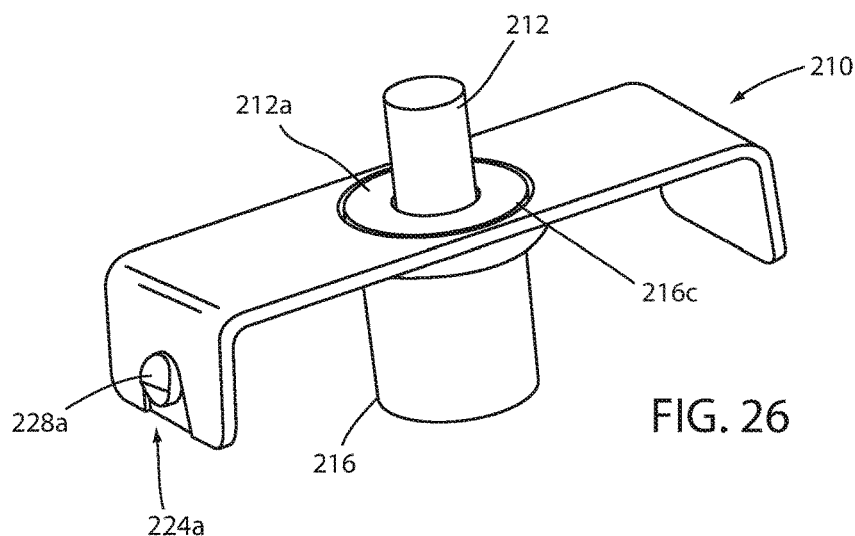
FIG. 26 is a perspective view of the lower side of the bolt holder of FIG. 25.
Figure 27:
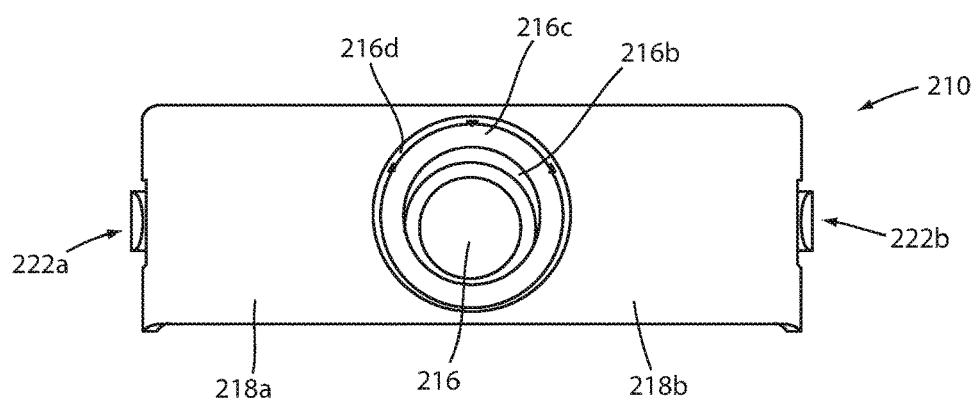
FIG. 27 is a bottom plan view (slightly skewed) of the bolt holder of FIG. 25.

As best seen in FIGS. 24, 25, and 26, detents 224a, 224b each have a tapered portion 228a, 228b, that provide guide surfaces so that when bolt holder 210 is pushed into weldment 98a, tapered portion 228a, 228b, which face the inner surfaces of sides 226 will urge ends 218c, 218d inwardly so that ends 218c, 218d will act as plate springs and generate a spring force against sides 226. Once tapered portions 228a, 228b move passed the upper edge of recesses 222a, 222b, ends 218c, 218d will return to their undeflected state (where arms 218c, 218d are returned to their generally orthogonal orientation relative to the horizontal portion of arms 218a, 218b (see FIG. 24) where detents 224a, 224b are fully inserted into recesses 222a, 222b and essentially locked in place by their upwardly facing orthogonal edges 230a, 230b (FIG. 24). Thus, bolt holders 210 are configured to provide a snap-fit coupling between them and the weldment.

In this manner, bolt holders 210 will remain attached to their respective weldment even when the weldment is no longer fastened to the floor. By the same token, the fasteners supported in bolt holders 210 will also remain coupled to the weldment and will remain aligned in the respective holes formed in the weldment.

As noted above, bolt holders 210 may also hold the washers of the respective fasteners. Referring to FIG. 24 again, as well as FIGS. 26 and 27, each bolt holder 210 is configured to receive and hold the washer 212a of the respective fastener 212. In the illustrated embodiment, bolt holder 210 includes an annular recess 216c at the lower end of cylindrical sleeve 216 about passageway 216a, which is sized to receive the washer 212a of the respective fastener. Further, annular recess 216c may be configured to hold the washer so that it too remains with the weldment when the weldment is disengaged from the floor and moved. In the illustrated embodiment, annular recess 216c may include one or more inwardly projecting structures 216d, such as ribs or the like, that provide a friction fit or snap fit when the washer is inserted into recess 216c to thereby provide a friction or spring like retention of washer 212a in recess 216c.

In this manner, with the washers 212a held in recesses 216c and with the fasteners 212 held in sleeves 216, the orientation and position of the fasteners may remain substantially stable and aligned with respect to the through holes 28a' in web 228 of weldment 98a.

Bolt holder 210 may be formed from a plastic, including reinforced plastic, by injection or press molding so that the structures are integrally formed together as a unitary member. Alternately, one or more components may be assembled together as an assembly. Further, one or more components may be formed from a metal or include a metal insert.

Although described as being secured between the sides of the weldment, the bolt holder may be configured to couple, such as by a snap-fit connection or connections, to the web 228 of the weldment 98a instead, or in addition to coupling to the sides of the weldment.

In this manner, the bolts and washers may be quickly unfastened from the floor while still remaining with the product. Specifically, a user can loosen fasteners 212 from the threaded holes in the floor, remove the cot fastening system, then re-install the cot fastening system without needing to align the fasteners and washers. This can help users in multiple ways: 1) prevents the need to take on and off covers when removing/reinstalling the cot fastening system, 2) the opening in top of bolt holder allows access to the bolt for easy removal of fastener with a hex wrench, and 3) prevents user from being able to misplace washers and bolts while the cot fastening system is removed from its fastened location. The bolt holder also includes features to assist with product assembly, including flexible arms with snap features and "crush ribs" on the bottom of the part that create a light press fit for the washer. As noted above, the crush ribs help hold the washer and fastener together while the cot fastening system is snapped into place.

While several forms of the invention have been shown and described, various alterations and changes can be made without departing from the spirit and broader aspects of the invention as defined in the appended claims, which are to be interpreted in accordance with the principles of patent law including the doctrine of equivalents. For example, while several components have been described as being formed from metal, and others are described as being formed from plastic, the material selection is provided as only exemplary and may be modified and include composite reinforced or composite materials. Further, while some components are described as being joined by fasteners, the various components may be joined by welding or be integrally formed, for example, by molding or casting or the like. Additionally, some components are shown as being formed from a single component, but it should be understood that they may be formed from an assembly of components, which are then joined together. Likewise, while some components are shown or described as separate components, they may be formed as a single component. Additionally, while several references are made to mounting of one or more components of the fastening system and anchoring assembly to the floor, it should be understood that this includes mounting to structures provided on or in the floor, including the floor plate described herein.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This comprises, for example, presently known alternative elements, such as those that might be currently known to one skilled in the art, and alternative elements that may be developed in the future, such as those that one skilled in the art might, upon development, recognize as an alternative. Further, the disclosed embodiments comprise a plurality of features that are described in concert and that might cooperatively provide a collection of benefits. Also, as noted above, the system of the present invention may be used on other pneumatic systems. Therefore, the present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

We claim:

1. A cot fastening system for fastening a cot, the cot having a foot end, a head end, a pair of head end load wheels, a head end cot attachment, a foot end cot attachment, and a safety bar, the head end load wheels having a load wheel spacing, and the head end load wheels being spaced a distance from the head end cot attachment, said cot fastening system comprising:
a frame configured for mounting to a floor of an emergency vehicle, the frame having a longitudinal axis and a cot loading direction along said longitudinal axis;
a stationary first restraint assembly for coupling to the foot end cot attachment, said first restraint assembly mounted to said frame in a fixed position;
a second restraint assembly for coupling to the head end cot attachment, said second restraint assembly mounted to said frame; and
wherein said frame includes a first section and a second section, said first section having a first width less than the load wheel spacing to allow the cot to straddle the frame, said first section comprising linear portions extending along said longitudinal axis from said first restraint assembly toward said second restraint assembly, and said second section extending from said linear portions of said first section along said longitudinal axis of said frame and diverging away from said longitudinal axis of said frame to a second width greater than said first width but less than the load wheel spacing between the head end load wheels to form a guide for guiding the head end load wheels of the cot when the head end cot attachment has passed the first restraint assembly.

2. The cot fastening system according to claim 1, further comprising a first mount mounting said first restraint assembly to said frame, and a second mount mounting said second restraint assembly to said frame, said frame extending between said first and second mounts.

3. The cot fastening system according to claim 2, wherein said second restraint assembly includes a catch, and said second mount comprises a second mount guide surface for guiding the head end cot attachment into alignment with said catch of said second restraint assembly.

4. The cot fastening system according to claim 3, wherein said first section and said second section each comprise a first end and a second end, said first restraint assembly located at or near said first end of said first section, said second end of said first section abutting said first end of said second section, and said second mount guide surface being adjacent said second end of said first section and between said first end and said second end of said first section.

5. The cot fastening system according to claim 4, wherein said second section includes a pair of diverging sides, a pair of parallel sides defining said second width, and transition sections between each of said diverging sides and said parallel sides, and said transition sections being spaced a distance from said second mount guide surface approximately equal to the distance from the head end load wheels and the head end cot attachment wherein the head end load wheels are first guided by said second section to align with said second restraint assembly followed by the head end cot attachment being guided by said second mount guide surface to align with said catch of said second restraint assembly.

6. The cot fastening system according to claim 4, wherein said first restraint assembly includes a latch, said second mount guide surface guiding said foot end cot attachment into alignment with said first restraint assembly, and said first mount comprises a first mount guide surface for guiding said foot end cot attachment into alignment with said latch of said first restraint assembly.

7. The cot fastening system according to claim 2, further comprising a guide member extending between said first and second mounts, said guide member for guiding the safety bar and for maintaining the safety bar in a non-deployed position while the cot is moved along the frame.

8. A cot fastening system for fastening a cot, the cot having a foot end, a head end, a pair of head end load wheels, a head end cot attachment, a foot end cot attachment, and a safety bar, the head end load wheels having a load wheel spacing, and the head end load wheels being spaced a distance from the head end cot attachment, said system comprising:
a frame configured for mounting to a floor of an emergency vehicle, the frame having a longitudinal axis and a cot loading direction along said longitudinal axis;
a first restraint assembly for coupling to the foot end cot attachment, said first restraint assembly mounted to said frame;
a second restraint assembly for coupling to the head end cot attachment, said second restraint assembly mounted to said frame; and
wherein said frame includes a first section and a second section, said first section having a first width less than the load wheel spacing to allow the cot to straddle the frame, and the second section extending from said first section along said longitudinal axis of said frame and diverging away from said longitudinal axis of said frame to a second width greater than said first width but less than the load wheel spacing to form a guide for guiding the head end load wheels of the cot when the head end cot attachment has passed the first restraint assembly; and
a spring for biasing the cot in a direction opposed to said cot loading direction.

9. The cot fastening system according to claim 1 further comprising a spring configured to apply a pre-load on at least one of said restraint assemblies.

10. The cot fastening system according to claim 9, wherein said at least one of said restraint assemblies comprises a latch, and said spring operable for biasing one of the cot attachments into engagement with said latch.

11. The cot fastening system according to claim 8, wherein said second restraint assembly includes said spring.

12. The cot fastening system according to claim 11, wherein one of said restraint assemblies comprises a pair of spring biased arms for engaging one of the cot attachments.

13. The cot fastening system according to claim 12, wherein each of said spring biased arms is pivotally mounted about a vertical axis.

14. The cot fastening system according to claim 1, wherein at least one restraint assembly of said first restraint assembly and said second restraint assembly includes a pair of opposed arms, each arm of said pair of opposed arms comprising a first end and a second end, each of said first ends being pivotally mounted about a pivot axis, and each of said second ends having a bearing surface for being engaged by one cot attachment of the cot attachments, and said arms configured to prohibit the one cot attachment from being released when the one cot attachment applies a compression force on said bearing surfaces of said arms.

15. The cot fastening system according to claim 14, wherein said arms are biased toward each other by springs.

16. The cot fastening system according to claim 14, wherein said pivot axes are orthogonal to the cot loading direction.

17. The cot fastening system according to claim 14, wherein said at least one restraint assembly comprises the first restraint assembly.

18. The cot fastening system according to claim 17, further comprising a spring for biasing the cot in a direction opposed from said cot loading direction.

19. The cot fastening system according to claim 18, wherein said spring is operable to bias the foot end cot attachment toward said first restraint assembly.

20. The cot fastening system according to claim 19, wherein said second restraint assembly includes said spring and a second spring, said springs for absorbing impact loads from the cot when the cot is loaded on to the frame and into engagement with the first and second restraint assemblies.

21. The cot fastening system according to claim 14, further comprising a release mechanism for selectively releasing said at least one restraint assembly, and said release mechanism including an overload spring to prevent said release mechanism from being overloaded when pressure is applied to the bearing surfaces of said arms of said at least one restraint assembly.

22. The cot fastening system according to claim 16, wherein each second end of each respective arm comprises a hook, each of said hooks providing a bearing surface aligned with and orthogonal to the pivot axis of the respective arm so that a pressure applied normal to the bearing surfaces of the hooks by the one cot attachment will limit pivotal motion of the arms about said pivot axes.

* * * * *